United States Patent
Kang et al.

(10) Patent No.: US 9,891,786 B2
(45) Date of Patent: Feb. 13, 2018

(54) METHOD AND DEVICE FOR PROVIDING MENU INTERFACE

(71) Applicant: SAMSUNG ELECTRONICS CO., LTD., Suwon-si (KR)

(72) Inventors: Nam-wook Kang, Seoul (KR); Do-hyoung Kim, Suwon-si (KR); Yong-gook Park, Yongin-si (KR); Young-kyu Jin, Seoul (KR); Woo-hyoung Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 14/227,522

(22) Filed: Mar. 27, 2014

(65) Prior Publication Data

US 2014/0298268 A1 Oct. 2, 2014

Related U.S. Application Data

(60) Provisional application No. 61/805,632, filed on Mar. 27, 2013.

(30) Foreign Application Priority Data

Jul. 18, 2013 (KR) ........................ 10-2013-0084934

(51) Int. Cl.
  *G06F 3/0482* (2013.01)
  *G06F 3/0488* (2013.01)
  *G06F 3/0484* (2013.01)

(52) U.S. Cl.
  CPC ........ *G06F 3/0482* (2013.01); *G06F 3/04847* (2013.01); *G06F 3/04886* (2013.01)

(58) Field of Classification Search
  CPC ........................................................ H04L 12/58
  See application file for complete search history.

(56) References Cited

U.S. PATENT DOCUMENTS

| 5,666,502 A | 9/1997 | Capps |
| 6,008,809 A | 12/1999 | Brooks |
| 6,397,337 B1 | 5/2002 | Garrett et al. |

(Continued)

FOREIGN PATENT DOCUMENTS

| CN | 102710847 A | 10/2012 |
| EP | 2 112 583 A1 | 10/2009 |

(Continued)

OTHER PUBLICATIONS

Communication dated Sep. 25, 2014, issued by the European Patent Office in counterpart European Application No. 14161980.9.

(Continued)

*Primary Examiner* — David Choi
(74) *Attorney, Agent, or Firm* — Sughrue Mion, PLLC

(57) ABSTRACT

A method, performed by a device, of providing a menu interface on a lock screen of the device, includes receiving a touch input on the lock screen; displaying, on the lock screen, a first level of the menu interface, the first level comprising a first plurality of menu items; receiving a first drag input in a direction of a first menu item from among the first plurality of menu items; and displaying, on the lock screen, a second level of the menu interface, the second level comprising a second plurality of menu items based on the direction of the first drag input.

15 Claims, 41 Drawing Sheets

(56) References Cited

U.S. PATENT DOCUMENTS

| | | | |
|---|---|---|---|
| 7,512,400 B2 | 3/2009 | Starbuck et al. | |
| 8,351,897 B2 | 1/2013 | Shin et al. | |
| 8,411,046 B2 | 4/2013 | Kruzeniski et al. | |
| 8,832,597 B2* | 9/2014 | Kurtenbach | G06F 3/0482 715/810 |
| 2005/0149879 A1 | 7/2005 | Jobs et al. | |
| 2005/0243979 A1 | 11/2005 | Starbuck et al. | |
| 2006/0167861 A1 | 7/2006 | Arrouye et al. | |
| 2006/0229097 A1 | 10/2006 | Flynt et al. | |
| 2007/0099642 A1 | 5/2007 | Jin et al. | |
| 2007/0150842 A1 | 6/2007 | Chaudhri et al. | |
| 2008/0020803 A1 | 1/2008 | Rios et al. | |
| 2008/0052717 A1 | 2/2008 | Lee | |
| 2008/0062141 A1 | 3/2008 | Chandri | |
| 2008/0109751 A1* | 5/2008 | Fitzmaurice | G06F 3/0488 715/793 |
| 2008/0166993 A1 | 7/2008 | Gautier et al. | |
| 2008/0168368 A1 | 7/2008 | Louch et al. | |
| 2008/0320033 A1 | 12/2008 | Koistinen et al. | |
| 2009/0013275 A1 | 1/2009 | May et al. | |
| 2009/0013282 A1 | 1/2009 | Mercer | |
| 2009/0019120 A1 | 1/2009 | Muguda | |
| 2009/0083847 A1 | 3/2009 | Fadell et al. | |
| 2009/0094339 A1 | 4/2009 | Allen et al. | |
| 2009/0240647 A1 | 9/2009 | Green et al. | |
| 2009/0241072 A1 | 9/2009 | Chaudhri et al. | |
| 2010/0023892 A1 | 1/2010 | Rakesh et al. | |
| 2010/0070898 A1 | 3/2010 | Langlois et al. | |
| 2010/0088634 A1 | 4/2010 | Tsuruta et al. | |
| 2010/0146451 A1 | 6/2010 | Jun-Dong et al. | |
| 2010/0211872 A1 | 8/2010 | Rolston et al. | |
| 2010/0229115 A1 | 9/2010 | Augustine et al. | |
| 2010/0269040 A1 | 10/2010 | Lee | |
| 2010/0306705 A1 | 12/2010 | Nilsson | |
| 2010/0313156 A1 | 12/2010 | Louch et al. | |
| 2011/0047134 A1 | 2/2011 | Zhang et al. | |
| 2011/0093812 A1 | 4/2011 | Fong | |
| 2011/0126156 A1 | 5/2011 | Krishnaraj et al. | |
| 2011/0154290 A1 | 6/2011 | Kelly | |
| 2011/0167387 A1 | 7/2011 | Stallings et al. | |
| 2011/0175930 A1 | 7/2011 | Hwang et al. | |
| 2011/0202872 A1 | 8/2011 | Park | |
| 2011/0258581 A1 | 10/2011 | Hu | |
| 2011/0300831 A1 | 12/2011 | Chin | |
| 2011/0316884 A1 | 12/2011 | Giambalvo et al. | |
| 2012/0005569 A1 | 1/2012 | Roh | |
| 2012/0005577 A1 | 1/2012 | Chakra et al. | |
| 2012/0017177 A1* | 1/2012 | Kim | G06F 3/04886 715/828 |
| 2012/0023573 A1 | 1/2012 | Shi | |
| 2012/0060123 A1* | 3/2012 | Smith | G06F 3/04883 715/833 |
| 2012/0084734 A1 | 4/2012 | Wilairat | |
| 2012/0117599 A1 | 5/2012 | Jin et al. | |
| 2012/0129496 A1 | 5/2012 | Park et al. | |
| 2012/0131471 A1 | 5/2012 | Terlouw et al. | |
| 2012/0164971 A1 | 6/2012 | Choi et al. | |
| 2012/0166997 A1 | 6/2012 | Cho et al. | |
| 2012/0174042 A1 | 7/2012 | Chang | |
| 2012/0179969 A1 | 7/2012 | Lee et al. | |
| 2012/0210253 A1 | 8/2012 | Luna et al. | |
| 2012/0210266 A1 | 8/2012 | Jiang et al. | |
| 2012/0256863 A1 | 10/2012 | Zhang et al. | |
| 2012/0272338 A1 | 10/2012 | Falkenburg et al. | |
| 2012/0289287 A1 | 11/2012 | Kokubo | |
| 2012/0290972 A1 | 11/2012 | Yook et al. | |
| 2012/0297298 A1 | 11/2012 | Dovey et al. | |
| 2012/0297304 A1 | 11/2012 | Maxwell | |
| 2012/0309433 A1 | 12/2012 | Jeong et al. | |
| 2012/0311499 A1* | 12/2012 | Dellinger | H04N 5/23206 715/835 |
| 2012/0324357 A1 | 12/2012 | Viegers et al. | |
| 2013/0042191 A1 | 2/2013 | Kim et al. | |
| 2013/0047119 A1 | 2/2013 | Lee | |
| 2013/0052993 A1 | 2/2013 | Kwon et al. | |
| 2013/0053105 A1 | 2/2013 | Lee et al. | |
| 2013/0054548 A1 | 2/2013 | Fosback et al. | |
| 2013/0063452 A1 | 3/2013 | Ali et al. | |
| 2013/0063479 A1 | 3/2013 | Butlin et al. | |
| 2013/0067376 A1 | 3/2013 | Kim et al. | |
| 2013/0083210 A1 | 4/2013 | Beckham et al. | |
| 2013/0091468 A1 | 4/2013 | Xie | |
| 2013/0132904 A1* | 5/2013 | Primiani | G06F 3/04886 715/834 |
| 2013/0169568 A1* | 7/2013 | Park | G06F 3/0488 345/173 |
| 2013/0227450 A1* | 8/2013 | Na | G06F 3/048 715/764 |
| 2013/0232256 A1 | 9/2013 | Lee et al. | |
| 2014/0075388 A1* | 3/2014 | Kuscher | G06F 3/0482 715/834 |
| 2014/0143856 A1* | 5/2014 | Wu | G06F 21/31 726/16 |
| 2014/0283012 A1* | 9/2014 | Eggerton | G06F 21/31 726/19 |
| 2014/0298268 A1* | 10/2014 | Kang | G06F 3/04847 715/841 |
| 2015/0040024 A1* | 2/2015 | Higashibeppu | G06F 3/04883 715/741 |
| 2017/0090738 A1 | 3/2017 | Kurtz et al. | |

FOREIGN PATENT DOCUMENTS

| | | |
|---|---|---|
| EP | 2230623 A1 | 9/2010 |
| EP | 2 533 140 A1 | 12/2012 |
| EP | 2 551 762 A1 | 1/2013 |
| FR | 2971069 A | 8/2012 |
| JP | 3135104 B2 | 2/2001 |
| JP | 2004-191642 A | 7/2004 |
| JP | 2012-181847 A | 9/2012 |
| KR | 10-0683483 B1 | 2/2007 |
| KR | 10-2007-0115622 A | 12/2007 |
| KR | 10-2007-0120368 A | 12/2007 |
| KR | 10-2010-0027689 A | 3/2010 |
| KR | 10-2010-0114779 A | 10/2010 |
| KR | 10-2010-0134234 A | 12/2010 |
| KR | 10-2011-0011226 A | 2/2011 |
| KR | 10-2011-0026811 A | 3/2011 |
| KR | 10-2012-0006805 A | 1/2012 |
| KR | 10-2012-0054837 A | 5/2012 |
| KR | 10-2012-0126161 A | 11/2012 |
| KR | 10-2012-0131906 A | 12/2012 |
| KR | 10-2013-0024074 A | 3/2013 |
| KR | 10-2013-0024346 A | 3/2013 |
| RU | 2347258 C2 | 2/2009 |
| RU | 2363039 C2 | 7/2009 |
| RU | 2408923 C2 | 1/2011 |
| WO | 2010/110613 A1 | 9/2010 |
| WO | 2010/144331 A2 | 12/2010 |
| WO | 2012032180 A1 | 3/2012 |
| WO | 2013/022849 A1 | 2/2013 |

OTHER PUBLICATIONS

Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software Website, Jul. 1, 2012, 2 pages total, XP055142907.
"Private Desktop, Screen Shots", Tropical Software Website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP 55143362.
Communication dated Aug. 28, 2014 issued by the European Patent Office in counterpart European Patent Application No. 14161672.2.

(56) References Cited

OTHER PUBLICATIONS

Communication dated Jun. 26, 2014 issued by the International Searching Authority in counterpart International Patent Application No. PCT/KR2014/002472.
Alexandra Chang; "Up Close with iOS 5: New Gestures"; Macworld; Oct. 14, 2011; 4 total pages; XP055135715.
"Overview of webOS—User Interface"; HP webOS Developer Center; Jan. 13, 2012; 4 total pages; XP055135739.
"HP/Palm WebOS—Multi-tasking Made Easy, Featuring the Palm Pre Plus"; Mar. 19, 2010; 1 total page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.
Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated May 23, 2017, issued by the Russian Patent Office in counterpart Russian Application No. 2015145945/08.
Communication dated Feb. 8, 2017, issued by the Federal Service on Intellectual Property in counterpart Russian Patent Application No. 2015145969.
Communication dated Feb. 21, 2017, issued by the European Patent Office in counterpart European Patent Application No. 14161998.1.
Communication dated Oct. 6, 2016, issued by the Russian Patent Office in counterpart Russian Application No. 2015145945.
Communication dated Oct. 6, 2016, issued by the European Patent Office in counterpart European Application No. 14161980.9.
Gina Trapani: "Seven Easy Ways to Integrate Your Google Apps", Sep. 9, 2009, XP055305805, (6 pages total).
Communication dated Oct. 24, 2017, issued by the European Patent Office in counterpart European Patent Application No. 14161998.1.
Communication dated Nov. 14, 2017, issued by the State Intellectual Property Office of the People's Republic of China in counterpart Chinese Patent Application No. 201410120449.1.

\* cited by examiner

METHOD AND DEVICE FOR PROVIDING MENU INTERFACE

CROSS-REFERENCE TO RELATED APPLICATIONS

This application claims priority from U.S. Provisional Application No. 61/805,632, filed on Mar. 27, 2013, in the United States Patent Trademark Office, and Korean Patent Application No. 10-2013-0084934, filed on Jul. 18, 2013, in the Korean Intellectual Property Office, the disclosures of which are incorporated herein by reference in their entirety.

BACKGROUND

1. Field

Methods and apparatuses consistent with exemplary embodiments relate to a method and device for providing a menu interface on a lock screen.

2. Description of the Related Art

Mobile terminals may be configured to perform a variety of diverse functions. Examples of such diverse functions may include data and voice communications, capturing a photo or a moving image (e.g., video) using a camera, storing voice data, reproducing a music file through a speaker system, displaying an image or video, etc.

Some mobile terminals include additional functionality for executing games, and other mobile terminals include additional functionality for being implemented as multimedia devices. Moreover, with accelerated research and development in technologies related to mobile terminals such as smart phones, diverse applications for such mobile terminals are also being developed.

Therefore, there is a need to develop a system to allow a user to easily and quickly access diverse specific applications on a lock screen of the mobile terminal (i.e., there is a need to provide the ability for easily/quickly accessing different applications when the mobile terminal is locked and thus displays a lock screen). Furthermore, mobile terminals may be configured with a touch screen, and there is a need for a system for preventing the lock screen from being unintentionally unlocked by a blind user.

SUMMARY

One or more exemplary embodiments include a method and device for providing a menu by displaying the menu on a lock screen, thereby increasing user accessibility to a specific function provided by the device.

According to an aspect of an exemplary embodiment, there is provided a method, performed by a device, of providing a menu interface on a lock screen of the device, including receiving an input on the lock screen; displaying, on the lock screen, a first level of the menu interface, the first level comprising a first plurality of menu items; receiving a first drag input in a direction of a first menu item from among the first plurality of menu items; and displaying, on the lock screen, a second level of the menu interface, the second level comprising a second plurality of menu items based on the direction of the first drag input.

The method may further include: receiving a user selection with respect to a second menu item from among the second plurality of menu items; and performing a function corresponding to the second menu item.

The receiving of the user selection may include: receiving a second drag input in a direction of the second menu item; and receiving a double tap input with respect to the second menu item.

The performing of the function corresponding to the second menu item may include: unlocking the lock screen.

The method may further include: receiving a second drag input in a direction of a second menu item from among the second plurality of menu items; and displaying, on the lock screen, a third level of the menu interface, the third level comprising a third plurality of menu items based on the direction of the second drag input.

The displaying of the second level of the menu interface may include: displaying the second plurality of menu items in a plurality of directions on the lock screen based on a location on the lock screen of the received input.

The displaying of the second level of the menu interface may include: extracting, from memory, the second plurality of menu items corresponding to the first menu item.

The displaying of the second level of the menu interface may include: displaying the second plurality of menu items at a location on the lock screen that does not include a moving path of the first drag input.

The first plurality of menu items may include a plurality of applications, and wherein the second plurality of menu items includes a plurality of functions included in an application, from among the plurality of applications, corresponding to the first menu item.

The first plurality of menu items may include a plurality of categories used to classify a plurality of applications, wherein the second plurality of menu items includes a list of applications, from among the plurality of applications, included in a category, from among the plurality of categories, corresponding to the first menu item, and wherein the third plurality of -menu items includes a list of functions included in an application, from among the list of applications, corresponding to the second menu item.

The performing of the function may include: executing an application corresponding to the selected second menu item or performing a function included in the application.

The method may further include: setting the first plurality of menu items and a respective second plurality of menu items corresponding to each of the set first plurality of menu items.

According to an aspect of another exemplary embodiment, there is provided a method, performed by a device, of providing a menu interface, the method including: displaying, on a lock screen of the device, a first level of the menu interface, the first level comprising a first plurality of menu items respectively displayed at a plurality of locations on the lock screen; receiving an input at a first location from among the plurality of locations; displaying, on the plurality of locations other than the first location, a second level of the menu interface, the second level comprising a second plurality of menu items included in a first menu item, from among the first plurality of menu items, displayed at the first location; receiving a first drag input in a direction of a second location from among the plurality of locations other than the first location; and performing a function corresponding to a second menu item, from among the second plurality of menu items, displayed at the second location.

The performing the function may include: unlocking the lock screen.

The performing the function may include displaying, on the plurality of locations other than the second location, a third level of the menu interface, the third level comprising a third plurality of menu items included in the second menu item displayed at the second location, and the method may further include receiving a second drag input in a direction of a third location of the lock screen on which a third menu item, from among the third plurality of menu items, is displayed; and displaying, on the plurality of locations other than the third location, a fourth level of the menu interface, the fourth level comprising a fourth plurality of menu items included in the third menu item.

The method may further include: setting the first plurality of menu items and a respective second plurality of menu items corresponding to each of the set first plurality of menu items.

The method may further include: receiving a touch input on the first location for more than a first time; and setting, based on the received touch input, a mode of the device to an editing mode for editing the first plurality of menu items respectively displayed at the plurality of locations.

The setting of the mode of the device to the editing mode may include: changing a position of the first menu item in response to dragging and dropping of the first menu item displayed at the first location to another location on the lock screen.

The setting of the mode of the device to the editing mode may further include: changing alignment positions of the first plurality of menu items, other than the first menu item, in response to changing the position of the first menu item.

According to an aspect of another exemplary embodiment, there is provided a device including: a user input unit configured to receive an input on a lock screen of the device, and configured to receive a first drag input in a direction of a first menu item, from among a first plurality of menu items; and a controller configured to control a display to display, on the lock screen, a first level of a menu interface, the first level comprising the first plurality of menu items based on the received input, and configured to display, on the lock screen, a second level of the menu interface, the second level comprising a second plurality of menu items based on the direction of the first drag input.

The user input unit may be configured to receive a user selection with respect to a second menu item from among the second plurality of menu items, and wherein the controller is configured to perform a function corresponding to the second menu item.

The user input unit may be configured to receive (i) a second drag input in a direction of the second menu item and (ii) a double tap input with respect to the second menu item, and wherein the controller is configured to perform the function corresponding to the second menu item based on the received double tap input.

The controller may be configured to unlock the lock screen as the function corresponding to the second menu item.

The user input unit may be configured to receive a second drag input in a direction of a second menu item, from among the second plurality of menu items, and wherein the controller is configured to control the display to display a third level of the menu interface, the third level comprising a third plurality of menu items based on the direction of the second drag input.

The controller may be configured to control the display to display the second plurality of menu items in a plurality of directions on the lock screen based on a location on the lock screen of the received input.

The controller may be configured to extract, from memory, the second plurality of menu items corresponding to the first menu item.

The controller may be configured to control the display to display the second level of the menu interface by displaying the second plurality of menu items at a location on the lock screen that does not include a moving path of the first drag input.

The controller may be configured to execute an application corresponding to the selected second menu item or perform a function included in the application.

The controller may be configured to set the first plurality of menu items and a respective second plurality of menu items corresponding to each of the set first plurality of menu items.

According to an aspect of another exemplary embodiment, there is provided a device including: a user input unit configured to receive an input at a first location from among a plurality of locations included on a lock screen of the device and configured to receive a first drag input in a direction of a second location from among the plurality of locations other than the first locations; a display configured to display, on the lock screen, a first level of a menu interface, the first level comprising a first plurality of menu items respectively displayed at the plurality of locations on the lock screen, and configured to display at the plurality of locations other than the first location, in response to the received input, a second level of the menu interface, the second level comprising a second plurality of menu items included in a first menu item, from among the first plurality of menu items, displayed at the first location; and a controller configured to perform, in response to the received first drag input, a function corresponding to a second menu item, from among the second plurality of menu items, displayed at the second location.

The controller may be configured to unlock the lock screen as the function corresponding to the second menu item.

The controller may be configured to perform the function by displaying, on the plurality of locations other than the second location, a third level of the menu interface, the third level comprising a third plurality of menu items included in second menu item displayed at the second location, the user input unit is configured to receive a second drag input in a direction of a third location of the lock screen on which a third menu item, from among the third plurality of menu items, is displayed, and the display is configured to display, on the plurality of locations other than the third location, a fourth level of the menu interface, the fourth level comprising a fourth plurality of menu items included in the third menu item.

The controller may be configured to set the first plurality of menu items and a respective second plurality of menu items corresponding to each of the set first plurality of menu items.

The user input unit may be configured to receive a touch input on the first location for more than a first time, and wherein the controller is configured to set, based on the received touch input, a mode of the device to an editing mode for editing the first plurality of menu items respectively displayed at the plurality of locations.

The controller may be configured to change a position of the first menu item in response to dragging and dropping of the first menu item displayed at the first location to another region on the lock screen.

The controller may be configured to change alignment positions of the first plurality of menu items, other than the first menu item, in response to changing the position of the first menu item. According to an aspect of another exemplary embodiment, there is provided a non-transitory computer-readable storage medium storing a computer program for executing one or more of the above-noted methods.

According to an aspect of another exemplary embodiment, there is provided a device including one or more processors configured to display, in response to receiving a touch input on a lock screen of a device, a plurality of elements on the lock screen; and display, in response to receiving a first drag input, a plurality of first-layer sub-elements corresponding to an element from among the plurality of elements on the lock screen based on a direction of the first drag input.

The one or more processors may be further configured to: receive, in response to displaying the plurality of first-layer sub-elements, a second drag input in a direction of a first sub-element from among the plurality of first-layer sub-elements.

The one or more processors may be further configured to: execute, in response to receiving the second drag input, a function corresponding to the first sub-element.

The one or more processors may be further configured to receive the touch input, the first drag input, and the second drag input via a touch tool contacting the lock screen, wherein the one or processors may be further configured to receive the touch input, the first drag input, and the second drag input while the touch tool is in continuous contact with the lock screen.

The one or more processors may be further configured to display, in response to receiving the second drag input, a plurality of second-layer sub-elements corresponding to the first sub-element on the lock screen based on a direction of the second drag input.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
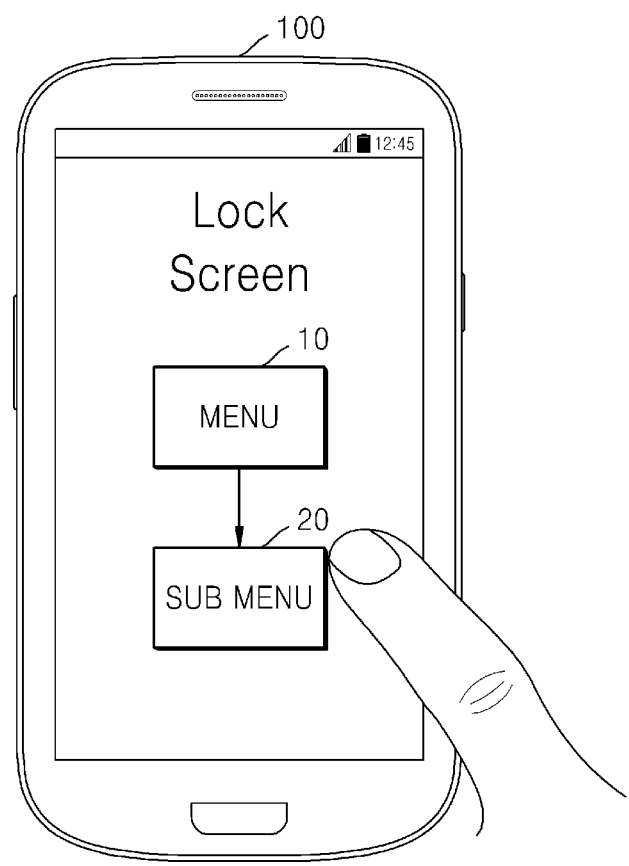
FIG. 1 is a diagram for explaining a device according to an exemplary embodiment.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the exemplary embodiments. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, the term "application" is a computer program set devised to perform a specific task. The application described in the specification may vary. For example, the application may include a call application, a message application, a social networking service (SNS) application, a game application, a moving image reproduction application, a map application, a memo application, a broadcasting application, an exercise support application, a payment application, a photo editing application, etc. but is not limited thereto.

One or more exemplary embodiments will now be described more fully with reference to the accompanying drawings. However, the one or more exemplary embodiments may be embodied in many different forms, and should not be construed as being limited to the exemplary embodiments set forth herein; rather, these exemplary embodiments are provided so that this disclosure will be thorough and complete, and will fully convey the concepts of this disclosure to those of ordinary skill in the art. In the following description, well-known functions or constructions are not described in detail since they would obscure the one or more exemplary embodiments with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

Throughout the specification, the term "lock-screen" indicates a software screen for unlocking a device. When the device receives an appropriate user input for unlocking the device displaying the lock-screen, the device may be unlocked.

FIG. 1 is a diagram for explaining a device 100 according to an exemplary embodiment.

The device 100 according to an exemplary embodiment may be a display apparatus that provides a lock screen. The device 100 according to an exemplary embodiment may include a touch screen.

According to an exemplary embodiment, various sensors may be provided in or near the touch screen to detect a user touch input on the touch screen. For example, a tactile sensor may be provided to detect the user touch input. The tactile sensor detects a contact of a specific object at least as sensitively as a person can detect similar contact. The tactile sensor may detect various types of information such as the roughness of a contact surface, the hardness of the contact object, the temperature of a contact point, or the like.

Another example of a sensor to detect the touch input on the touch screen is a proximity sensor. The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor.

Throughout the specification, the "touch input" or "user touch input" is a user gesture on the touch screen performed to control the device 100, etc. For example, touches described in the specification may include a tap/tapping, a touch & hold/touching and holding, a double-tap/double tapping, a drag/dragging, panning, a flick/flicking, a drag-and-drop/dragging and dropping, a pinch/pinching, a swipe/swiping, etc.

"Tapping" is a user's motion of touching a screen by using a finger or a touch tool such as an electronic pen and then instantly lifting the finger or touch tool from the screen without moving the finger or touch tool. That is, a time difference between a touch-in time when the finger or the touch tool touches on the screen and a touch-out time when the finger or the touch tool is lifted from the screen is shorter than or equal to, for example, 1 second.

"Touching & holding" is a user's motion of touching a screen by using a finger or a touch tool such as an electronic pen and then maintaining the above touching motion for a critical time (e.g., 2 seconds) or longer, after touching the screen. That is, a time difference between a touch-in time and a touch-out time is greater than or equal to the critical time, for example, 2 seconds. When a touch input lasts more than the critical time, in order to inform the user whether the touch input is tapping or touching & holding, a feedback signal may be provided in a visual, acoustic, or tactile manner. The critical time may vary according to exemplary embodiments.

"Double tapping" is a user's motion of touching the screen twice by using the finger or touch tool (such as a stylus pen). That is, double tapping is a user's motion of tapping the screen twice with a predetermined time in between the taps.

"Dragging" is a user's motion of touching the screen by using the finger or touch tool and moving the finger or touch tool to another position on the screen while maintaining contact with the screen. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of performing a dragging or panning motion at a critical speed or more, for example, 100 pixels/s, by using the finger or touch tool. The dragging (panning) motion or the flicking motion may be distinguished based on whether the moving speed of the finger or touch tool is over the critical speed, for example, 100 pixels/s, or not.

"Dragging & Dropping" is a user's motion of dragging an object to a predetermined position on the screen by using the finger or touch tool and then dropping the object at that position.

"Pinching" is a user's motion of moving two fingers touching the screen. The pinching motion is a gesture to magnify (open pinch) or contract (close pinch) an object or a page depending on the direction of movement of the two fingers. A magnification value or a contraction value is determined according to the distance between the two fingers.

"Swiping" is a user's motion of touching an object on the screen by using the finger or touch tool and simultaneously moving the object horizontally or vertically by a predetermined distance. A swiping motion in a diagonal direction may not be recognized as a swiping event.

The device 100 according to an exemplary embodiment may display at least one menu 10 on the lock screen. Throughout the specification, the "menu 10" refers to an item that is displayed on the lock screen and may be selected by the user. The menu 10 according to an exemplary embodiment may be expressed as a simple symbol, text, an icon, etc., but is not limited thereto.

The device 100 according to an exemplary embodiment may display a lower layer menu based on a user input. For example, the device 100 according to an exemplary embodiment may display at least one sub menu 20 corresponding to a certain element included in the menu 10 on the lock screen according to a user drag input. The lower layer menu will be expressed as the sub menu 20 for convenience of description below.

Meanwhile, the sub menu 20 may have a hierarchical structure. Thus, for convenience of description, a first-layer sub-menu will be described as a layer menu higher than a second-layer sub-menu, and the second-layer sub-menu will be described as a layer menu higher than a third-layer sub-menu below.

For convenience of description, a plurality of elements included in the menu 10 will be expressed as a plurality of menus, a first element among the plurality of elements will be expressed as a first menu, a first-layer sub-menu will be expressed as a first layer sub menu, a plurality of sub-elements included in the first-layer sub-menu will be expressed as a plurality of first layer sub menus, and one sub-element among the plurality of sub-elements will be expressed as a first sub-menu below.

The device 100 according to an exemplary embodiment may be implemented in various forms. For example, the device 100 described in the specification may include a cellular phone, a smart phone, a laptop computer, a tablet personal computer (PC), an e-book terminal, a digital broadcasting terminal, a personal digital assistant (PDA), a portable multimedia player (PMP), a navigation device, an MP3 player, etc. but the device 100 is not limited thereto.

A method of providing a menu on the lock screen performed by the device 100 according to an exemplary embodiment will be described in detail with reference to FIG. 2 below.

Figure 2:
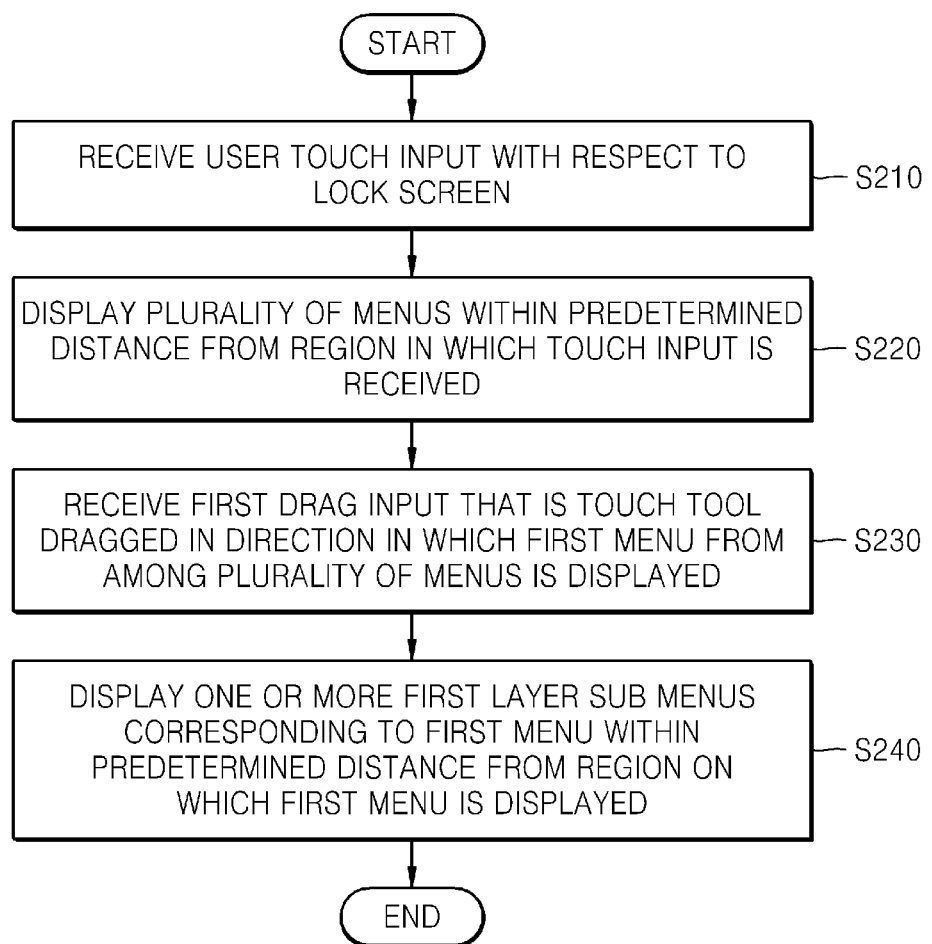
FIG. 2 is a flowchart of a method in which a device provides a plurality of menus according to an exemplary embodiment.

FIG. 2 is a flowchart of a method in which the device 100 provides a plurality of menus according to an exemplary embodiment.

In operation S210, the device 100 according to an exemplary embodiment may receive a user touch input with respect to a lock screen (i.e., the device 100 receives a user touch input while the device 100 displays a lock screen). For example, when a user touches a predetermined region (e.g., location) of the lock screen by using a touch tool (for example, a finger or an electronic pen), the device 100 according to an exemplary embodiment may detect a touch position on the lock screen, a touch holding time, a type of the touch input, etc.

In operation S220, the device 100 according to an exemplary embodiment may display the plurality of menus within a predetermined distance from a region in which the touch input is received. For example, the device 100 according to an exemplary embodiment may display the plurality of menus around a region in which the touch input is detected when the device 100 detects that the touch input touching the lock screen with the touch tool for more than a predetermined time (for example, for more than 2 seconds).

The plurality of menus according to an exemplary embodiment may be a list of a plurality of applications or may be a list of categories/groups used to classify the plurality of applications but is not limited thereto. The categories/groups may include a communication category/group, a social network service (SNS) category/group, a media category/group, a notifications category/group, and a games category/group but the categories/groups are not limited thereto.

The device 100 according to an exemplary embodiment may display the plurality of menus in a plurality of previously determined directions with respect to the region (i.e., a location) in which the touch input is received. For example, when the plurality of previously determined directions are north, south, east, and west, the device 100 may display the menus in four directions of north, south, east, and west with respect to the region in which the touch input is received. When the plurality of previously determined directions are north, northeast, south, southeast, east, southwest, west, and northwest, the device may display the menus in eight directions with respect to the region in which the touch input is received. The plurality of previously determined directions may be changed by the user, the device 100, or an external server.

Meanwhile, according to an exemplary embodiment, the plurality of menus displayed on the lock screen may be previously determined menus by the user, the device 100, or the external server. The plurality of menus displayed on the lock screen may be changed by a user setting. For example, the user may change the number of menus, types of menus, etc. This will be described in more detailed with reference to FIGS. 15 through 19C below.

In operation S230, the device 100 according to an exemplary embodiment may receive a first drag input that is dragging the touch tool in a direction in which a first menu is displayed, from among the plurality of menus, while maintaining the contact of the touch tool with the screen. In the exemplary embodiment, a drag input may be expressed as a swipe input, a flick input, etc.

The device 100 according to an exemplary embodiment may extract one or more previously determined first layer sub menus corresponding to the first menu from a memory according to the first drag input. In this regard, according to an exemplary embodiment, a moving distance of the first drag input may not be limited.

For example, when the user slightly drags the touch tool in the direction in which the first menu is displayed while maintaining the contact of the touch tool with the screen, the device 100 may extract the first layer sub menus corresponding to the first menu from the memory. That is, according to an exemplary embodiment, the user may not need to exactly drag the touch tool to a region (location) on which the first menu is displayed while maintaining the contact of the touch tool with the screen. Instead, the user may simply drag the touch tool towards the first menu which the user desires to select without fully dragging the touch tool within the region on which the first menu is displayed.

In operation S240, the device 100 according to an exemplary embodiment may display the one or more first layer sub menus corresponding to the first menu within a predetermined distance from the region on which the first menu is displayed. For example, the device 100 according to an exemplary embodiment may display the one or more first layer sub menus corresponding to the first menu around the first menu based on the first drag input.

The device 100 according to an exemplary embodiment may display the one or more first layer sub menus around the first menu in consideration of the moving direction information of the first drag input. For example, the device 100 according to an exemplary embodiment may display the one or more first layer sub menus on a region that does not include a moving path of the first drag input, from among a plurality of regions. That is, when the user drags the touch tool in an upper direction in which the first menu is displayed while maintaining contact of the touch tool with the screen, the device 100 may display the first layer sub menus on or near a region on which the first menu is displayed but not a lower part of the region through which the user dragged the touch tool.

According to an exemplary embodiment, when the plurality of menus includes the categories used to classify the plurality of applications, the first layer sub menus may include a list of one or more applications included in the categories.

According to an exemplary embodiment, when the plurality of menus includes a list of the plurality of applications, the one or more first layer sub menus may include a list of functions of those applications.

The device 100 according to an exemplary embodiment may receive a user selection with respect to a first sub menu from among the one or more first layer sub menus. For example, the device 100 according to an exemplary embodiment may receive a second drag input that is dragging the touch tool in a direction in which the first sub menu is displayed from a point where the first drag input ends while maintaining contact of the touch tool with the screen. The device 100 may receive a double tap input with respect to the first sub menu. That is, the user may select the first sub menu by double tapping a region on which the first sub menu is displayed after dragging the touch tool (for example, a finger or an electronic pen) in the direction in which the first sub menu is displayed.

The device 100 according to an exemplary embodiment may perform a function corresponding to the first sub menu when the device 100 receives the user selection with respect to the first sub menu. For example, when the user double taps the region on which the first sub menu is displayed after dragging the touch tool (for example, the finger or the electronic pen) in the direction in which the first sub menu is displayed, the device 100 may provide an application corresponding to the first sub menu, one function included in the application, or at least one piece of content included in the application. In this regard, the device 100 according to an exemplary embodiment may unlock the lock screen and display an application execution window on an unlocked screen.

The "content" refers to digital information provided over a wired/wireless communication network throughout the specification. The content according to an exemplary embodiment may include moving image content (for example, TV program videos, video on demand (VOD), user created content (UCC), music video, Youtube videos, etc.), still image content (for example, photos, pictures, etc.), text content (for example, e-books including poetry, novels, etc., letters, working files, web pages, etc.), music content (for example, music, musical programs, radio broadcasting, etc.), but is not limited thereto.

According to an exemplary embodiment, even if the user does not set a lock pattern, the user may unlock the lock screen according to a predetermined touch input and quickly execute a predetermined application. When the user is visually impaired or cannot clearly view a screen, the user may quickly approach the predetermined application or predetermined content through a touch input with respect to the lock screen. A plurality of menus and sub menus displayed on the lock screen will now be described in more detail with reference to FIGS. 3A through 5B below.

Figure 3A:
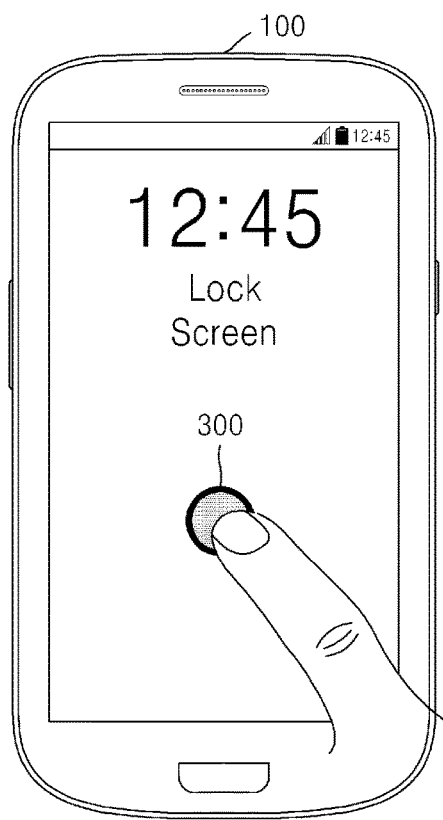
FIGS. 3A and 3B illustrate examples in which a device displays a plurality of menus based on a touch input according to an exemplary embodiment.
Figure 3B:
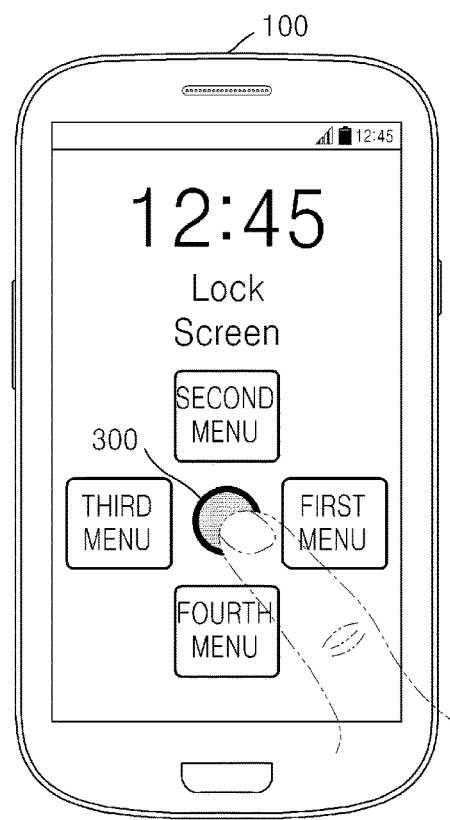

FIGS. 3A and 3B illustrate examples of the device 100 that displays a plurality of menus based on a touch input according to an exemplary embodiment.

Referring to FIG. 3A, the device 100 according to an exemplary embodiment may receive the touch input of a user with respect to a lock screen (e.g., the user touch input is received while the device 100 is locked and is displaying a lock screen). The device 100 according to an exemplary embodiment may obtain information regarding a region 300 in which the touch input is received.

Referring to FIG. 3B, the device 100 according to an exemplary embodiment may display the plurality of menus within a predetermined distance from the region 300 in which the touch input is received based on the touch input. For example, the device 100 may respectively display first through fourth menus in north, south, east, and west directions with respect to the region 300 in which the touch input is received. Thus, according to an exemplary embodiment, the user may acknowledge or be made aware of the plurality of menus accessible on the lock screen.

Figure 4:
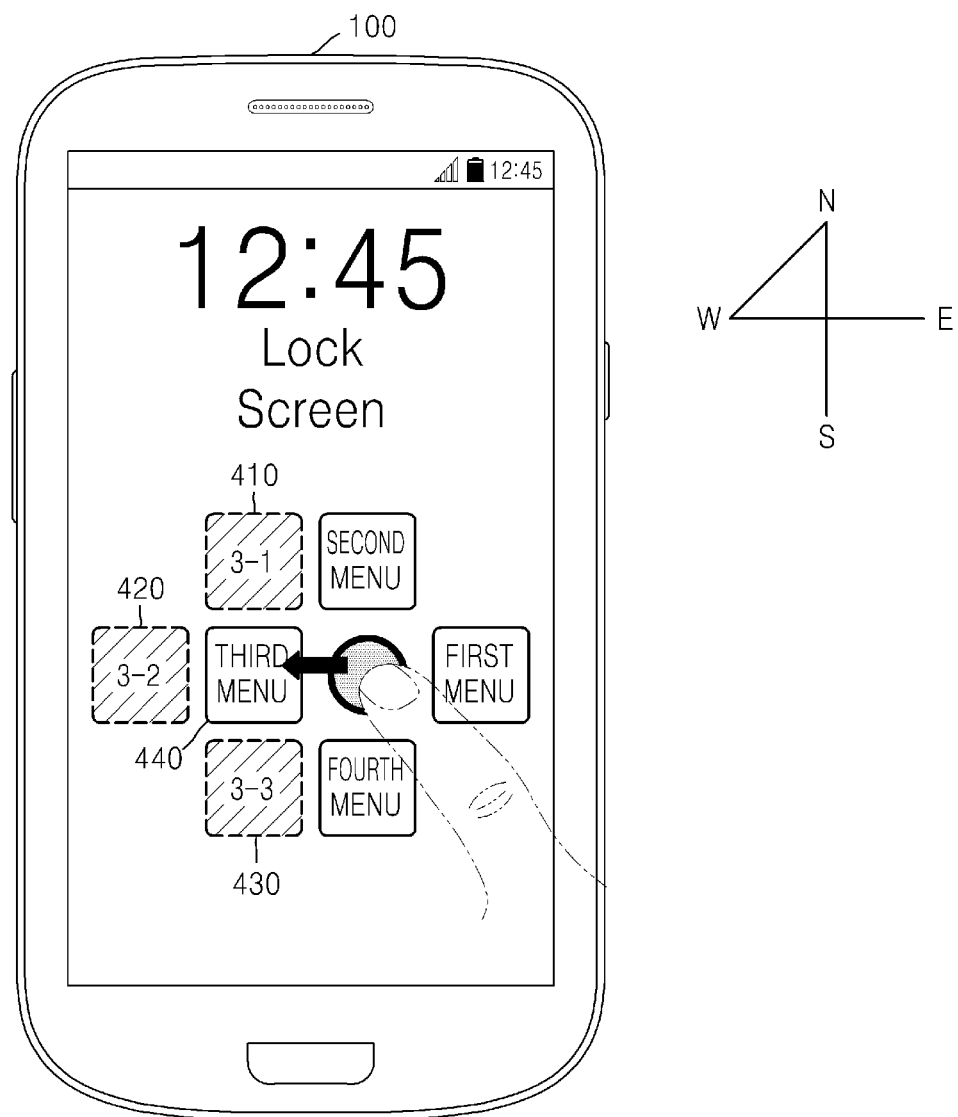
FIG. 4 illustrates an example in which a device displays a plurality of sub menus based on a drag input according to an exemplary embodiment.

FIG. 4 illustrates an example of the device 100 that displays a plurality of sub menus based on a drag input according to an exemplary embodiment.

Referring to FIG. 4, a user may drag the touch tool in a direction (for example, a west direction) in which a third menu is displayed from among the plurality of menus while maintaining contact of the touch tool with the screen.

In this regard, the device 100 may detect a first drag input of the user. The device 100 may display sub menus corresponding to the third menu around the third menu in a moving direction of the first drag input. The device 100 according to an exemplary embodiment may display the sub menus corresponding to the third menu on a region excluding a part that includes a moving path of the first drag input.

For example, the device 100 may display a first sub menu 3-1, a second sub menu 3-2, and a third sub menu 3-3 corresponding to the third menu on a north region 410, a west region 420, and a south region 430 other than an east region 440 present in the opposite direction (an east direction) to the moving direction (a west direction) of the first drag input.

Therefore, according to an exemplary embodiment, the user may acknowledge or be made aware of the plurality of sub menus accessible on the lock screen in a drag input direction.

Figure 5A:
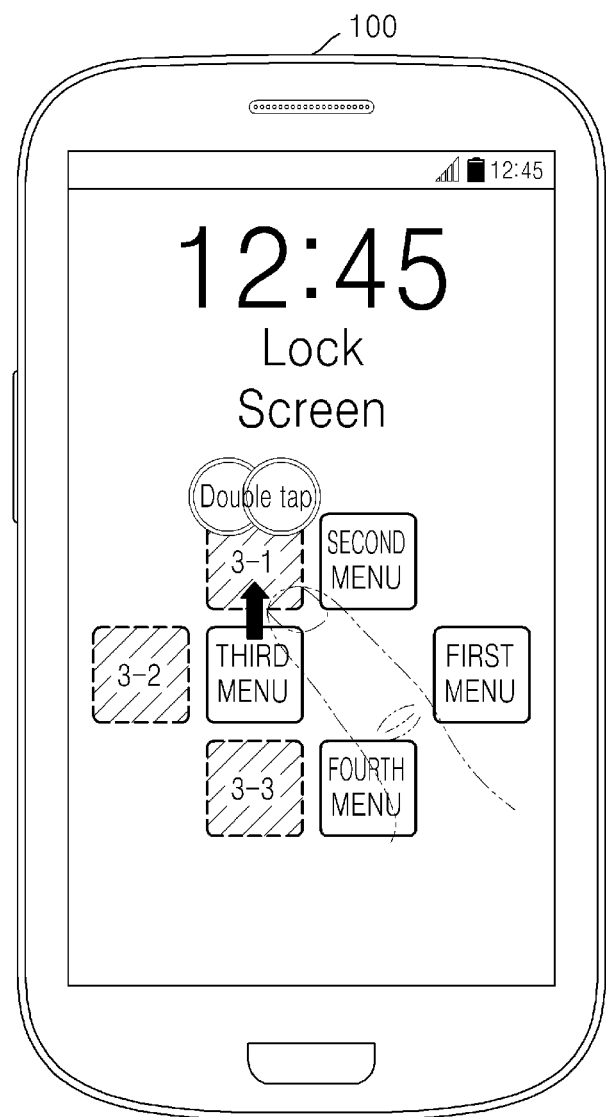
FIGS. 5A and 5B illustrate examples in which a device performs a function corresponding to a sub menu according to an exemplary embodiment.
Figure 5B:
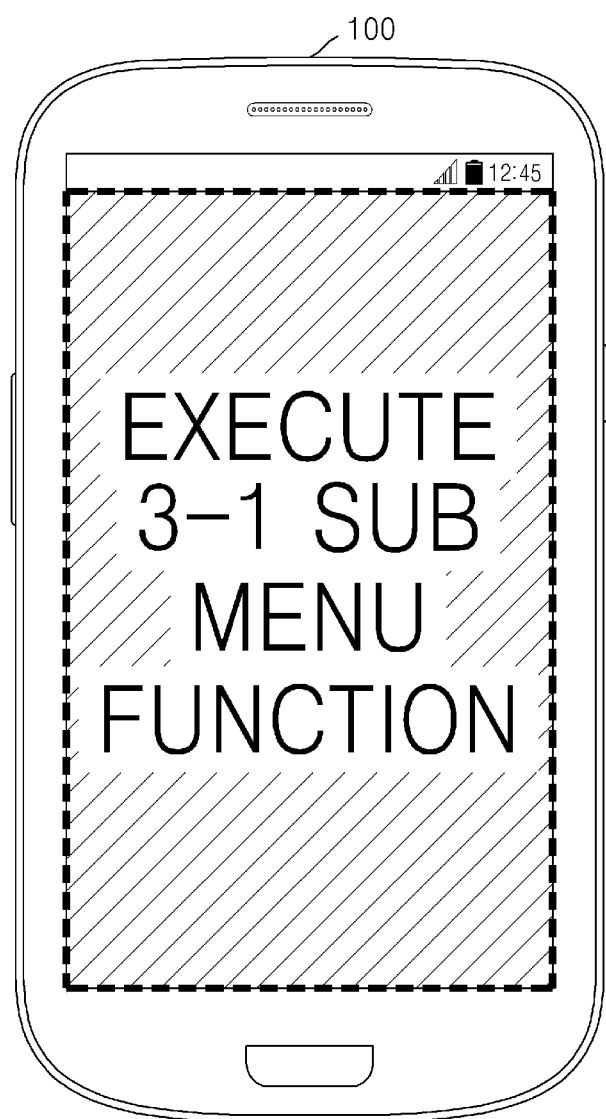

FIGS. 5A and 5B illustrate examples in which the device 100 performs a function corresponding to the first sub menu 3-1 according to an exemplary embodiment. A case in which a user selects the third sub menu 3-3 corresponding to the third menu will now be described with reference to FIGS. 5A and 5B.

Referring to FIG. 5A, according to an exemplary embodiment, the device 100 may receive a second drag input that is dragging of the touch tool in a direction in which the first sub menu 3-1 corresponding to the third menu is displayed from a point where a first drag input ends while maintaining contact of the touch tool with the screen. The device 100 may receive a user input that double taps a region on which the first sub menu 3-1 corresponding to the third menu is displayed.

In this regard, the device 100 according to an exemplary embodiment may determine that a user selects the first sub menu 3-1 based on moving direction information of the second drag input when the device 100 receives a double tap input. Thus, the user according to an exemplary embodiment may select the first sub menu 3-1 even if the user does not exactly double tap the region on which the first sub menu 3-1 is displayed.

Referring to FIG. 5B, the device 100 may perform the function corresponding to the first sub menu 3-1 according to the double tap input of the user. For example, when the first sub menu 3-1 is a game application, the device 100 may execute the game application. When the first sub menu 3-1 is a photo folder, the device 100 may display photo content included in the photo folder.

Although the double tap input that involves tapping a screen twice is an example of a touch input that selects a sub menu in FIGS. 5A and 5B, the double tap input may include an input of tapping the screen more than three times according to exemplary embodiments.

According to an exemplary embodiment, the user may unlock the lock screen through two drag inputs and the double tap input to allow the device 100 to quickly perform a specific application or function. Moreover, when the user does not view a screen or is visually impaired, the device 100 according to an exemplary embodiment may allow the user to easily access a specific menu, function, or application through a touch input of a predetermined pattern.

Figure 6:
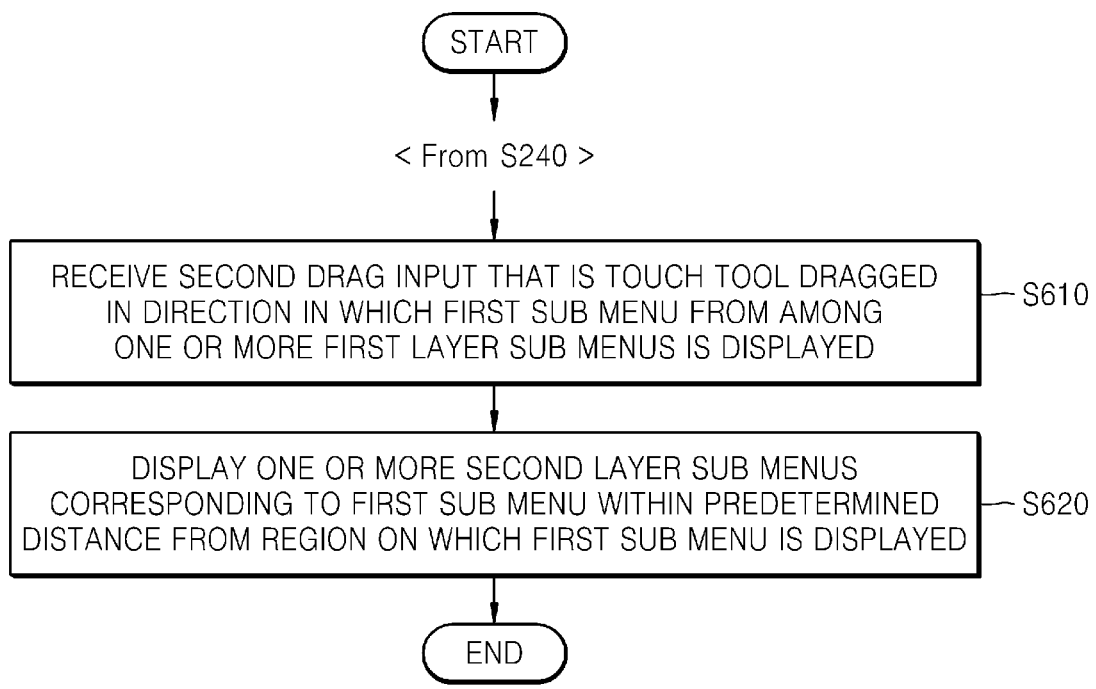
FIG. 6 is a flowchart of a method in which a device provides a second layer sub menu corresponding to a first layer sub menu according to an exemplary embodiment.

FIG. 6 is a flowchart of a method in which the device 100 provides a second layer sub menu corresponding to a first layer sub menu according to an exemplary embodiment.

Referring to operation S240 of FIG. 2, the device 100 may display one or more first layer sub menus corresponding to a first menu within a predetermined distance from a region on which the first menu is displayed in consideration of moving direction information of a first drag input.

In operation S610, the device 100 according to an exemplary embodiment may receive a second drag input that is dragging of the touch tool in a direction in which a first sub menu is displayed from among the one or more first layer sub menus from a point where the first drag input ends while maintaining contact of the touch tool with the screen.

In operation S620, the device 100 according to an exemplary embodiment may display one or more second layer sub menus corresponding to a first sub menu within a predetermined distance from a region on which the first sub menu is displayed according to the second drag input.

The device 100 according to an exemplary embodiment may display the one or more second layer sub menus around the first sub menus based at least in part on moving direction information of the second drag input. For example, the device 100 may display sub menus corresponding to a third menu around the third menu in a moving direction of the first drag input. That is, the device 100 according to an exemplary embodiment may display the one or more second layer sub menus on a region excluding a part that includes a moving path of the second drag input.

The second layer sub menus may be lower layer menus than the first layer sub menus. For example, when the first layer sub menus are applications, the second layer sub menus may be functions provided by the applications. When the first layer sub menus are folders, the second layer sub menus may be lower folders within the folder hierarchy.

Meanwhile, the device 100 according to an exemplary embodiment may extract one or more previously determined second layer sub menus corresponding to the first sub menu from a memory according to the second drag input. In this regard, according to an exemplary embodiment, a moving distance of the second drag input may not be limited. For example, when a user slightly drags the touch tool in the direction in which the first sub menu is displayed while maintaining contact of the touch tool with the screen, the device 100 may extract the second layer sub menus corresponding to a first sub menu from the memory. That is, according to an exemplary embodiment, the user may not need to exactly drag the touch tool to the region on which the first sub menu is displayed while maintaining contact of the touch tool with the screen.

Therefore, the device 100 according to an exemplary embodiment may efficiently provide a menu on a small screen. For example, although the first sub menu is displayed on an edge part, the user may select one of the second layer sub menus by slightly moving a touch tool towards the edge part where the first sub menu is displayed without necessarily moving the touch tool on the edge part.

The device 100 according to an exemplary embodiment may be useful to visually impaired people that may not be able to clearly view the screen. For example, visually impaired users may be unable to clearly view the menu displayed on the screen, and thus they may have difficulties in dragging the touch tool to a corresponding position. However, according to an exemplary embodiment, the user may select a corresponding menu by dragging the touch tool in a direction in which the corresponding menu is displayed, and thus the device 100 according to an exemplary embodiment may allow visually impaired persons to easily access a specific menu.

An example in which the device 100 according to an exemplary embodiment hierarchically displays sub menus in a drag input direction will now be described with reference to FIGS. 7A through 10B below.

Figure 7A:
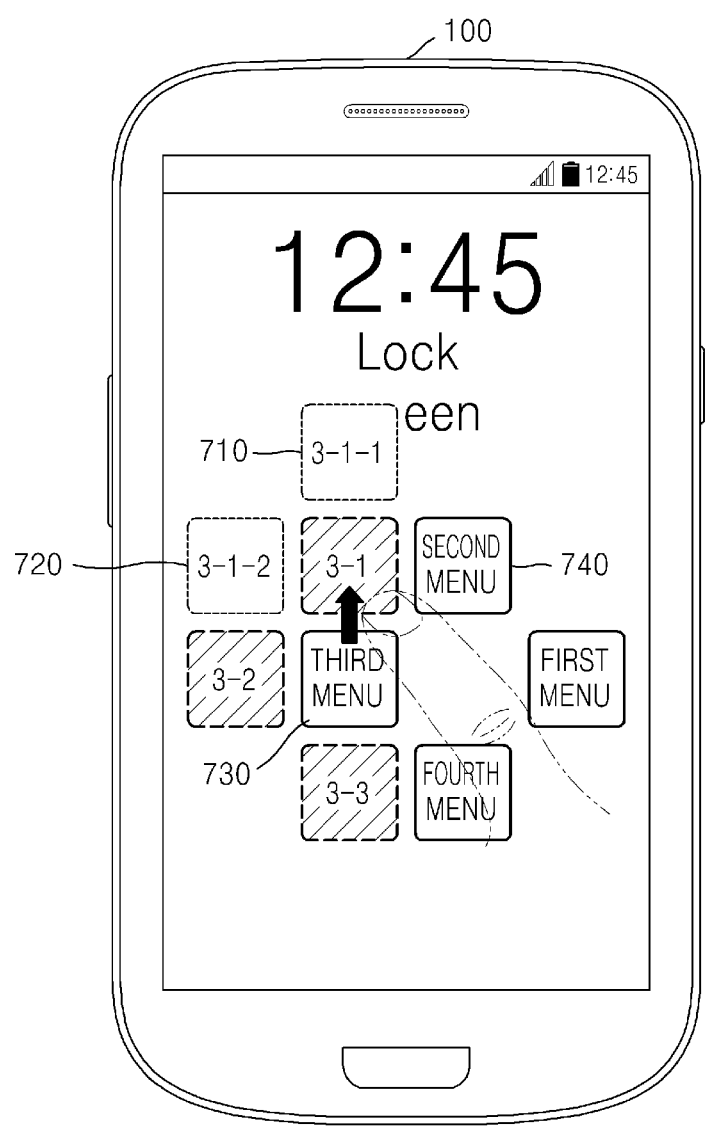
FIGS. 7A and 7B illustrate examples in which a device displays second layer sub menus according to an exemplary embodiment.
Figure 7B:
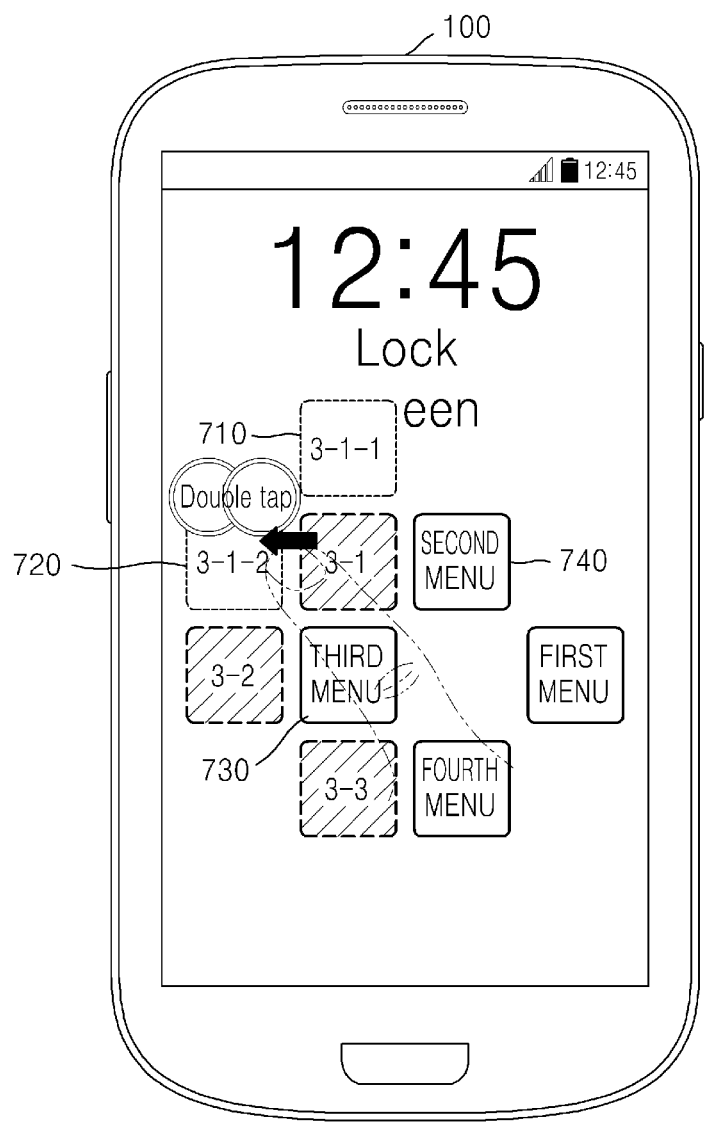

FIGS. 7A and 7B illustrate examples in which the device 100 displays second layer sub menus according to an exemplary embodiment.

Referring to FIG. 7A, the device 100 according to an exemplary embodiment may receive a second drag input that is dragging the touch tool in a direction (for example, a north direction) in which a 3-1 sub menu is displayed while maintaining contact of the touch tool with the screen after receiving a first drag input that is dragging the touch tool in a direction of a third menu. In this regard, the device 100 may display second layer sub menus corresponding to the 3-1 sub menu around the 3-1 sub menu in a moving direction of the second drag input.

For example, the device 100 may display a 3-1-1 sub menu and a 3-1-2 sub menu corresponding to the 3-1 sub menu on a north region 710 and a west region 720 other than a south region 730 present in the opposite direction (a south direction) to the moving direction (a north direction) of the second drag input. A second menu is displayed on an east region 740 of the 3-1 sub menu, and thus the device 100 may not display the second layer sub menus corresponding to the 3-1 sub menu on the east region 740.

Referring to FIG. 7B, the device 100 according to an exemplary embodiment may receive a third drag input that is dragging the touch tool in a direction in which the 3-1-2 sub menu corresponding to the 3-1 sub menu is displayed from a point where the second drag input ends while maintaining contact of the touch tool with the screen. The device 100 may receive a double tap user input on or around the region where the 3-1-2 sub menu is displayed on the lock screen.

The device 100 according to an exemplary embodiment may determine that a user selects the 3-1-2 sub menu based on moving direction information of the third drag input and receipt of the double tap input. That is, the user according to an exemplary embodiment may select the 3-1-2 sub menu even if the user does not exactly double tap the west region 720 on which the 3-1-2 sub menu is displayed.

The device 100 according to an exemplary embodiment may unlock the lock screen according to the double tap input of the user and perform a function corresponding to the 3-1-2 sub menu.

Meanwhile, the device 100 according to an exemplary embodiment may display third layer sub menus corresponding to the 3-1-2 sub menu around the 3-1-2 sub menu according to the third drag input. In this regard, the device 100 may display the third layer sub menus on the north region 710 and a further west region of the 3-1-2 sub menu in consideration of a moving direction (a west direction) of the third drag input.

Figure 8A:
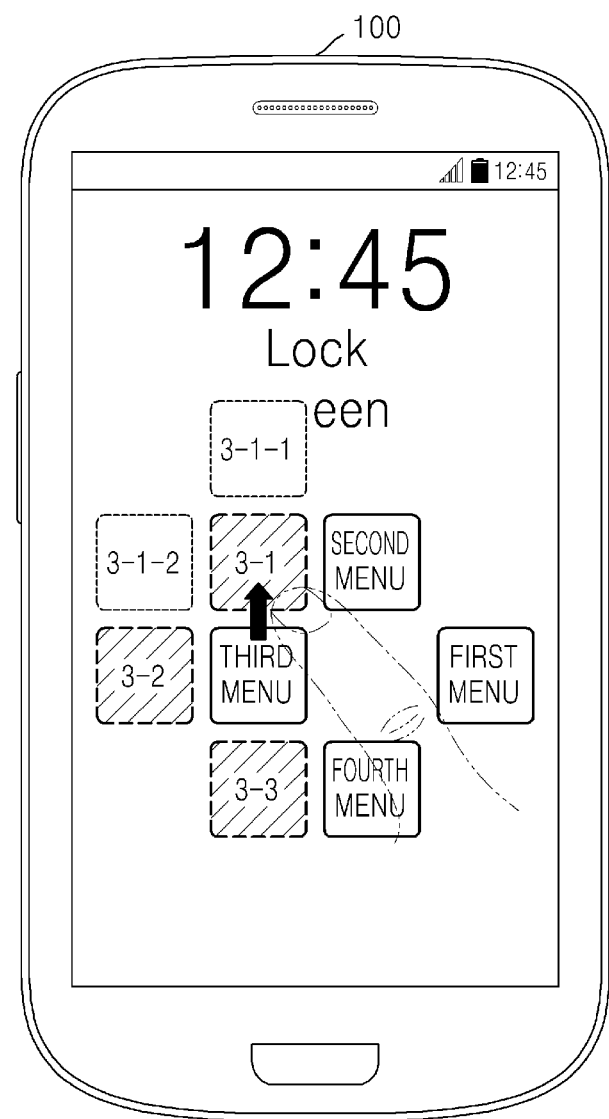
FIGS. 8A and 8B illustrate examples in which a device receives a third drag input in the opposite direction to a direction of a second drag input according to an exemplary embodiment.
Figure 8B:
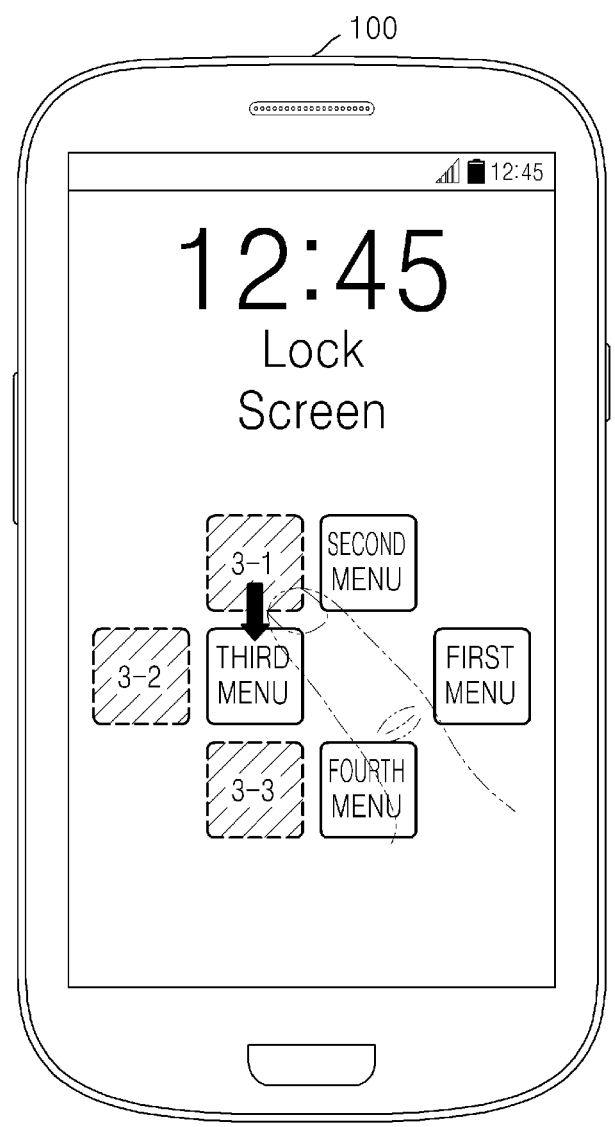

FIGS. 8A and 8B illustrate examples in which the device 100 receives a third drag input in the opposite direction to a direction of a second drag input according to an exemplary embodiment.

Referring to FIG. 8A, the device 100 according to an exemplary embodiment may receive the second drag input that is dragging the tough tool in a direction (for example, a north direction) in which a 3-1 sub menu is displayed while maintaining contact of the touch tool with the screen after receiving a first drag input that is dragging of the touch tool in a direction of a third menu. In this regard, the device 100 may display second layer sub menus (for example, a 3-1-1 sub menu and a 3-1-2 sub menu) corresponding to the 3-1 sub menu around the 3-1 sub menu in a moving direction (for example, the north direction) of the second drag input.

Referring to FIG. 8B, the device 100 may receive the third drag input that is dragging of the touch tool in the opposite direction (for example, a south direction) to the moving direction of the second drag input while maintaining contact of the touch tool with the screen after receiving the second drag input.

The device 100 according to an exemplary embodiment may no longer display the second layer sub menus (for example, the 3-1-1 sub menu and the 3-1-2 sub menu) corresponding to the 3-1 sub menu on a lock screen based on the third drag input.

If the user drags the touch tool in a direction in which a 3-3 sub menu is displayed, the device 100 may display the second layer sub menus (for example, a 3-3-1 sub menu and the 3-3-2 sub menu) corresponding to the 3-3 sub menu on a south region and a west region of a region on which the 3-3 sub menu is displayed.

Figure 9A:
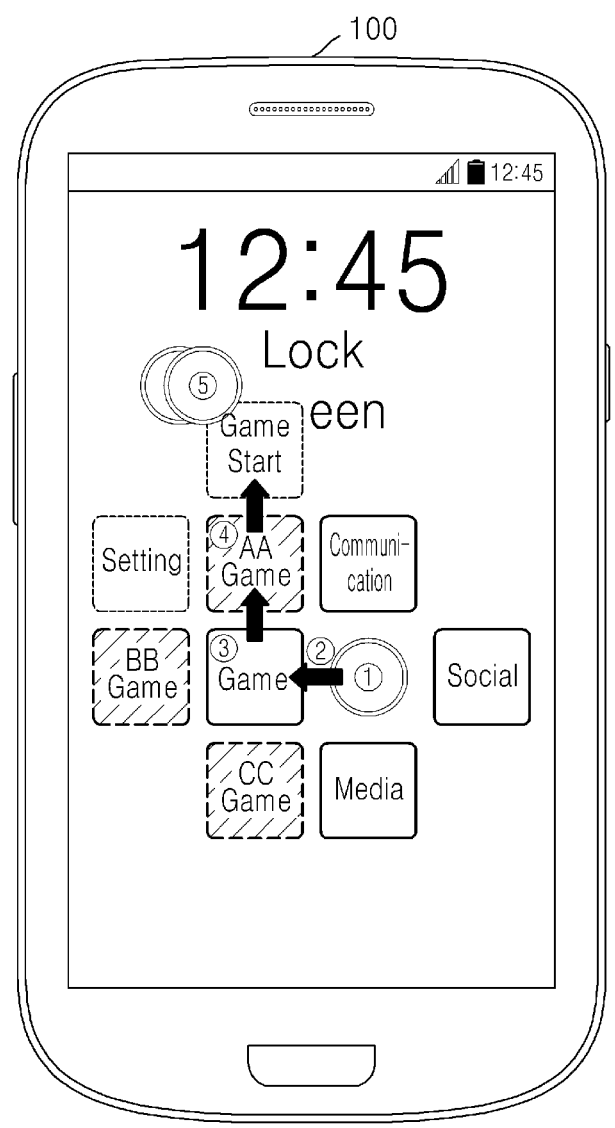
FIGS. 9A and 9B illustrate examples in which a device displays sub menus based on moving direction information according to an exemplary embodiment.
Figure 9B:
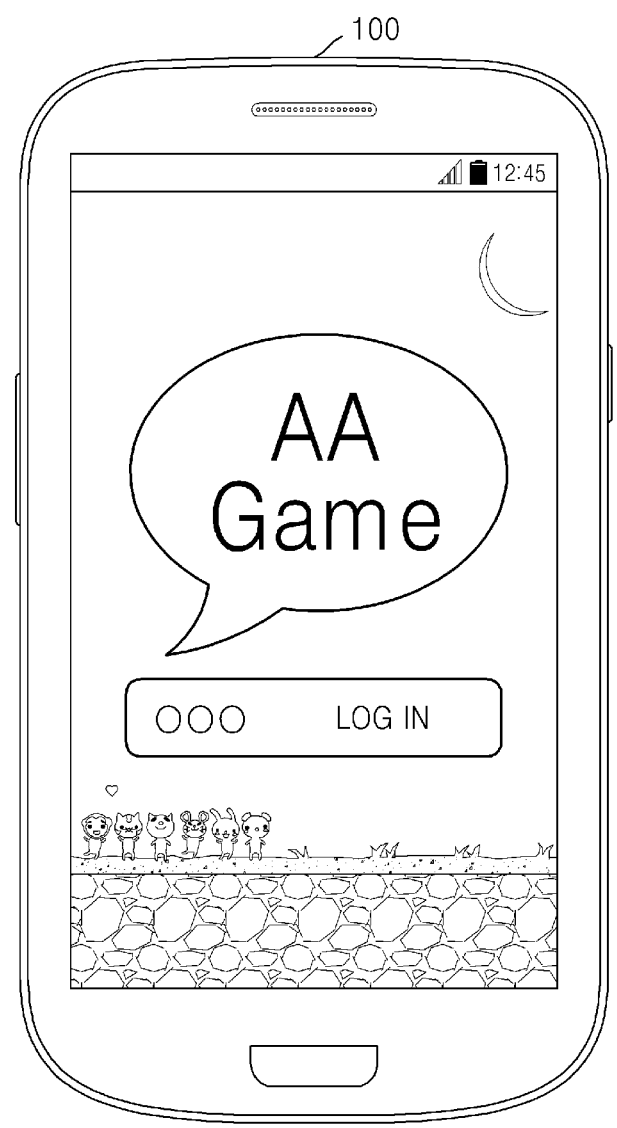

FIGS. 9A and 9B illustrate examples in which the device 100 displays sub menus based on moving direction information according to an exemplary embodiment.

Referring to FIG. 9A, when the device 100 receives a touch input with respect to a lock screen (①), the device 100 may display a plurality of menus. In this regard, the plurality of menus may include categories used to classify a plurality of applications. For example, the plurality of menus may include a communication menu, a SNS ("social") menu, a media menu, and a game menu.

When the device 100 receives a first drag input that is dragging of a touch tool in a direction (a west direction) in which the "game" menu from among the plurality of menus is displayed while maintaining contact (②) of the touch tool with respect to the lock screen, the device 100 may display first layer sub menus corresponding to the "game" menu. For example, the device 100 may display the first layer sub menus on a west region, a north region, and a south region of the menu "game" in a moving direction (the west direction) of the first drag input. The first layer sub menus corresponding to the "game" menu may be types of game applications. The device 100 according to an exemplary embodiment may display a "BB game" menu on the west region of the "game" menu, an "AA game" menu on the north region, and a "CC game" menu on the south region as the first layer sub menus.

When the device 100 receives a second drag input that is dragging of the touch tool in a direction (a north direction) in which "AA game" is displayed from a point where the first drag input ends while maintaining contact of the touch tool (③) with the screen, the device 100 may display second layer sub menus corresponding to "AA game". For example, the device 100 may display second layer sub menus on a north region and a west region of "AA game" in a moving direction (the north direction) of the second drag input. The second layer sub menus corresponding to "AA game" may be types of functions supported by the "AA game" application. The device 100 according to an exemplary embodiment may display a "game start" menu on the north region of the "AA game" menu and a "setting" menu on the west region as the second layer sub menus.

When the device 100 receives a third drag input that is dragging of the touch tool in a direction (the north direction) in which the "game start" menu is displayed from a point where the second drag input ends while maintaining contact of the touch tool (④) with the screen, and receives a double tap input (⑤), the device 100 may perform a function corresponding to the "game start" menu.

Referring to FIG. 9B, the device 100 according to an exemplary embodiment may unlock the lock screen and provide a start screen of "AA game".

Figure 10A:
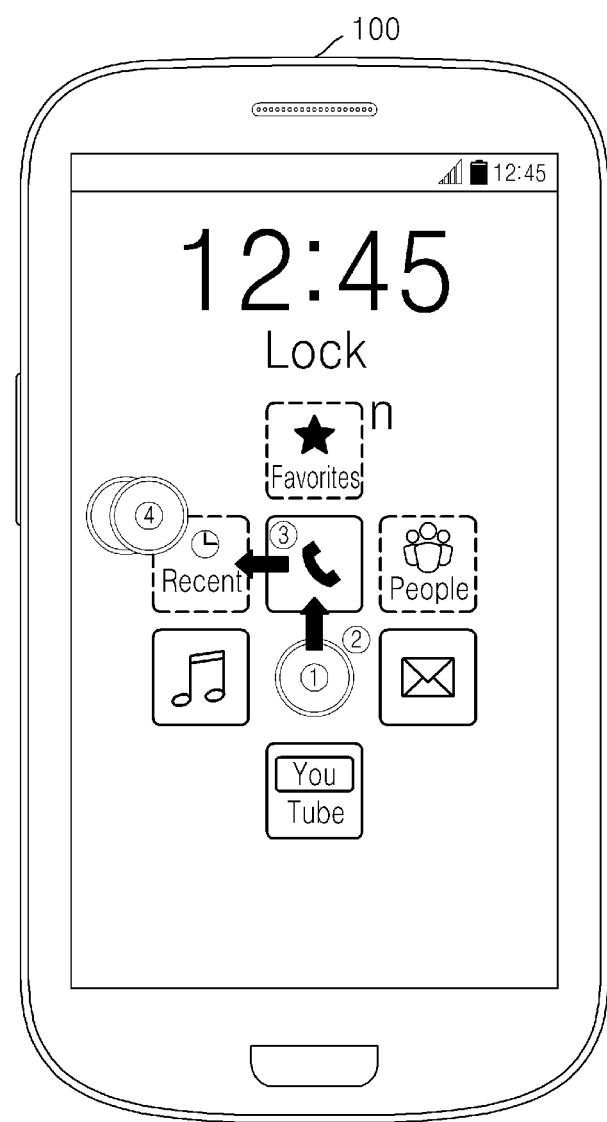
FIGS. 10A and 10B illustrate additional examples in which a device displays sub menus based on moving direction information according to an exemplary embodiment.
Figure 10B:

FIGS. 10A and 10B illustrate further examples in which the device 100 displays sub menus based on moving direction information according to an exemplary embodiment.

Referring to FIG. 10A, when the device 100 receives the touch input with respect to the lock screen (①), the device 100 may display a plurality of menus around the touch input. In this regard, the plurality of menus may include a list of a plurality of applications. For example, the plurality of menus may include a call application, a message application, a music play application, a SNS application, etc. The plurality of menus according to an exemplary embodiment may be displayed as images indicating the plurality of applications.

When the device 100 receives a first drag input that is dragging of a touch tool in a direction (a north direction) in which the "call application" from among the plurality of menus is displayed while maintaining contact (②) of the touch tool with respect to the lock screen, the device 100 may display sub menus corresponding to the "call application". The device 100 according to an exemplary embodiment may display the sub menus corresponding to the "call application" in a moving direction (the north direction) of the first drag input. The sub menus corresponding to the "call application" may be functions supported by the "call application". For example, the device 100 may display a "favorites" menu on a north region with respect to the "call application", a "recent calls" menu on a west region, and a "phone number list" ("people") menu on an east region.

When the device 100 receives a second drag input that is dragging of the touch tool in a direction (a west direction) in which the "recent calls" menu is displayed from a point where the first drag input ends while maintaining contact of the touch tool (③) with the screen, and receives a double tap input (④) on or around the region where the "recent calls" menu is displayed, the device 100 may perform a function corresponding to the "recent calls".

Referring to FIG. 10B, the device 100 may unlock the lock screen and provide a recent call list on a screen.

Meanwhile, according to an exemplary embodiment, when the device 100 receives the second drag input that is dragging of the touch tool in the direction (the west direction) in which the "recent calls" menu is displayed from a point where the first drag input ends while contact of the touch tool with the screen is maintained, the device 100 may display sub menus corresponding to the "recent calls" menu around the "recent calls". For example, the other party's information (for example, Kevin, Mom, etc.) included in the recent call list may be displayed around the "recent calls". In this regard, when the user double taps a region on which Kevin is displayed after dragging a touch tool to the region, the device 100 may unlock the lock screen and attempt to initiate a call to Kevin.

According to an exemplary embodiment, the device 100 may hierarchically display sub menus in a drag input direction. A method in which the device 100 according to an exemplary embodiment provides a plurality of menus on a lock screen according to another exemplary embodiment will be described in more detail with reference to FIG. 11 below.

Figure 11:
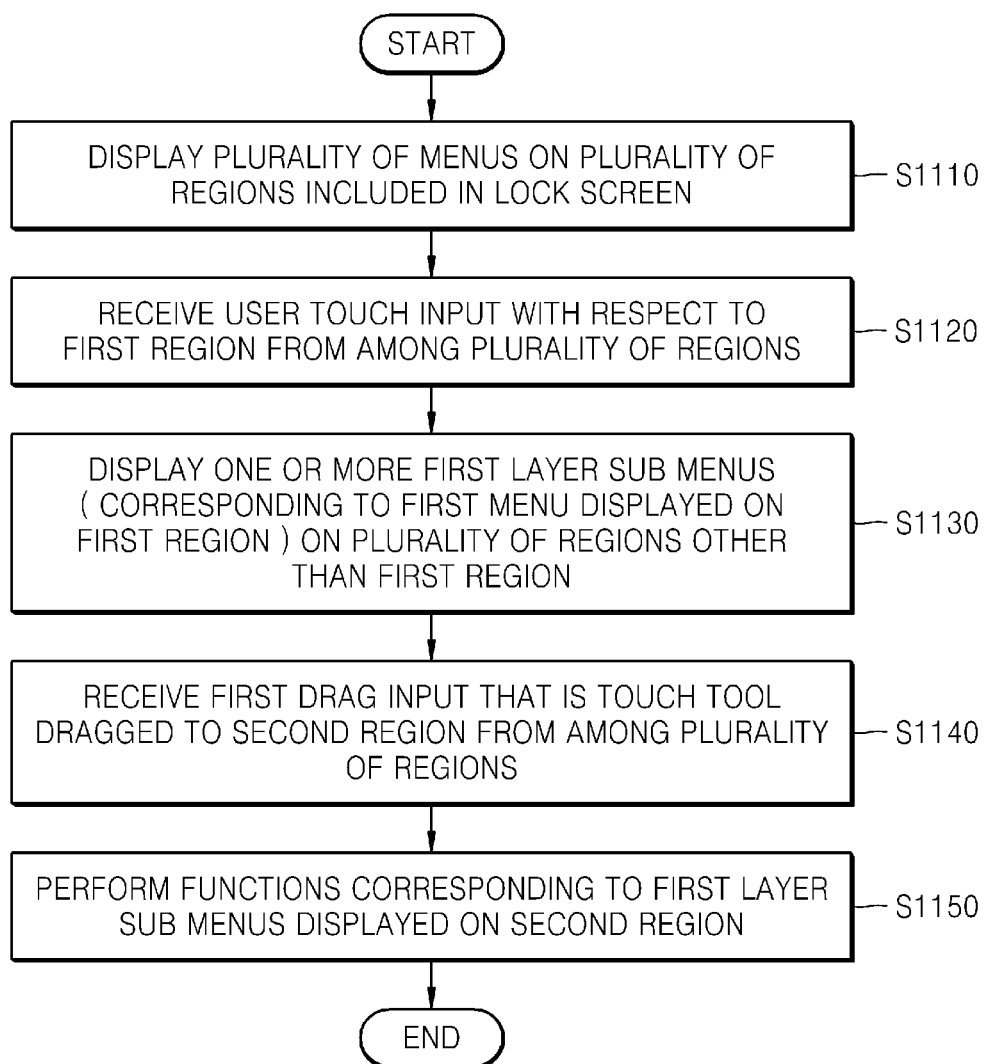
FIG. 11 is a flowchart of a method in which a device provides a plurality of menus according to another exemplary embodiment.

FIG. 11 is a flowchart of a method in which the device 100 provides a plurality of menus according to another exemplary embodiment.

In operation S1110, the device 100 according to an exemplary embodiment may display the plurality of menus on a plurality of regions included in a lock screen. For example, when power is input into a display, the device 100 may provide the plurality of menus on the lock screen. The plurality of menus according to an exemplary embodiment may be a list of a plurality of applications or a category list used to classify the plurality of applications but is not limited thereto.

In operation S1120, the device 100 according to an exemplary embodiment may receive a touch input of a user with respect to a first region from among a plurality of regions. In this case, the device 100 according to an exemplary embodiment may extract information regarding one or more first layer sub menus corresponding to a first menu displayed on the first region from a memory.

In operation S1130, the device 100 according to an exemplary embodiment may display the one or more first layer sub menus corresponding to the first menu on the plurality of regions other than the first region. For example, when the plurality of regions are split into four regions (for example, the first region, a second region, a third region, and a fourth region), the device 100 may display the first layer sub menus corresponding to the first menu on the second through fourth regions rather than on the first region.

In operation S1140, the device 100 according to an exemplary embodiment may receive a first drag input that is dragging of a touch tool to the second region from among the plurality of regions while maintaining contact of the touch tool with the screen after receiving the touch input with respect to the first region in operation S1120. In this regard, according to an exemplary embodiment, a moving distance of the first drag input may not be limited.

For example, even if the user does not exactly drag the touch tool to the second region, when the user drags the touch tool in a direction of the second region (i.e., towards the second region), the device 100 may determine that the first layer sub menus displayed on the second region are selected.

In operation S1150, the device 100 according to an exemplary embodiment may perform functions corresponding to the first layer sub menus displayed on the second region.

For example, when the user lifts a touch tool from a screen after the first drag input, the device 100 may perform the functions corresponding to the first layer sub menus displayed on the second region. The device 100 according to an exemplary embodiment may unlock the lock screen at a touch-out time when the user lifts the touch tool from the screen.

Meanwhile, according to another exemplary embodiment, the device 100 may receive a second drag input that is dragging of the touch tool in the third region on which a first sub menu from among one or more first layer sub menus is displayed from a point where the first drag input ends while maintaining contact of the touch tool with the screen. In this regard, the device 100 may display one or more second layer sub menus corresponding to the first sub menu on the plurality of regions other than the third region.

An example in which the device 100 according to an exemplary embodiment displays menus and sub menus on a lock screen will be described in detail below.

Figure 12A:
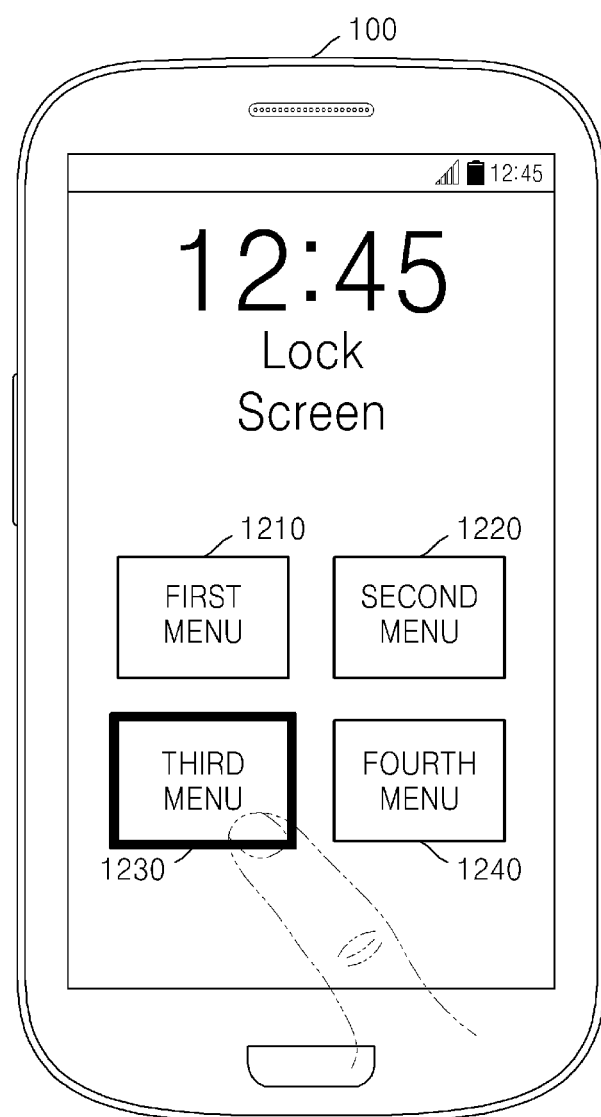
FIGS. 12A and 12B illustrate examples in which a device displays first layer sub menus in a region (location) other than a selection region (location) according to an exemplary embodiment.
Figure 12B:
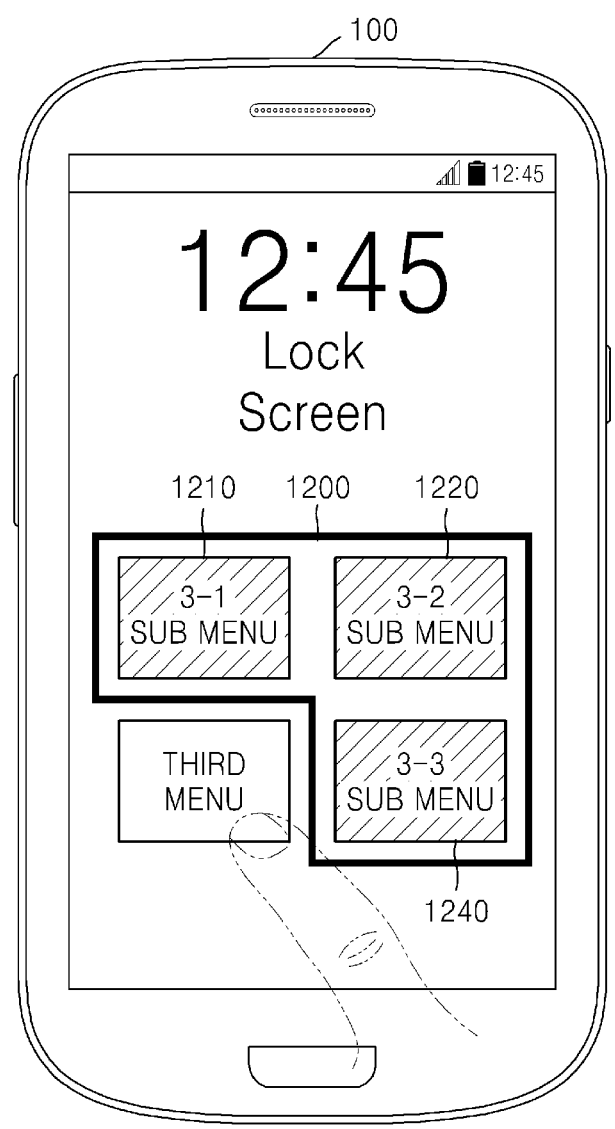

FIGS. 12A and 12B illustrate examples in which the device 100 displays first layer sub menus on a region other than a selection region according to an exemplary embodiment.

Referring to FIG. 12A, the device 100 according to an exemplary embodiment may display a plurality of menus (for example, first through fourth menus) on a plurality of regions (for example, a first region 1210, a second region 1220, a third region 1230, and a fourth region 1240) included in a lock screen. The device 100 may receive a touch input with respect to the third region 1230 on which the third menu is displayed.

In this case, referring to FIG. 12B, the device 100 according to an exemplary embodiment may display sub menus corresponding to the third menu on the plurality of regions 1200 other than the third region 1230 on which the third menu is displayed. For example, the device 100 may display a 3-1 sub menu on the first region 1210 on which the first menu was displayed, a 3-2 sub menu on the second region 1220 on which the second menu was displayed, and a 3-3 sub menu on the fourth region 1240 on which the fourth menu was displayed. Therefore, according to an exemplary embodiment, a user may hierarchically acknowledge or be made aware of the plurality of menus accessible on the lock screen.

Meanwhile, the lock screen is split into four regions in FIG. 12A or 12B but is not limited thereto. For example, the lock screen may be split into six or eight regions.

Figure 13A:
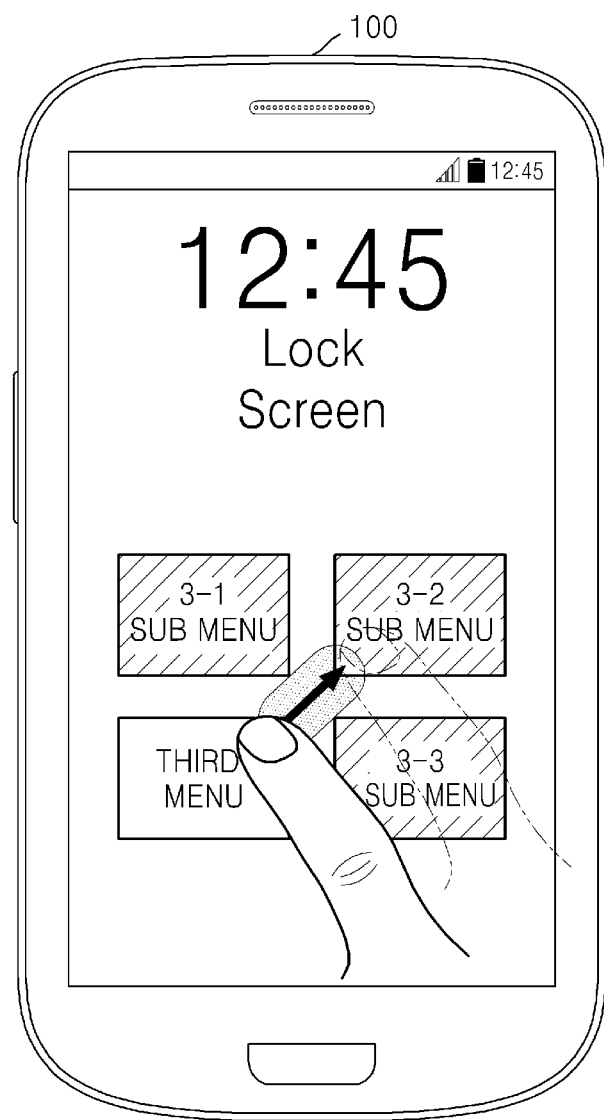
FIGS. 13A and 13B illustrate examples of performing a function corresponding to a sub menu according to an exemplary embodiment.
Figure 13B:
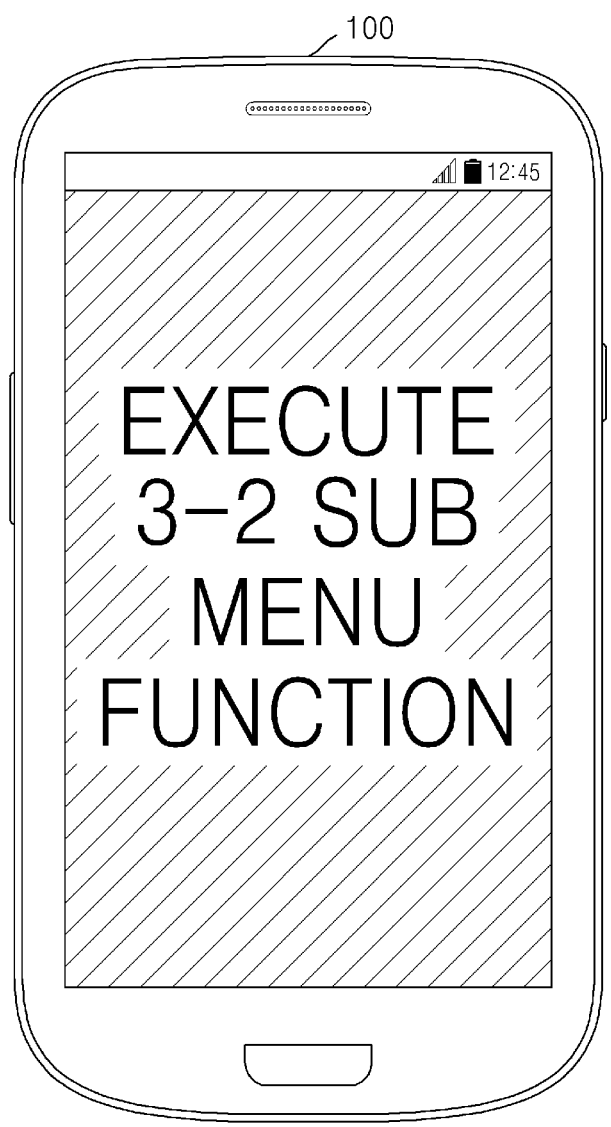

FIGS. 13A and 13B illustrate examples of performing a function corresponding to a sub menu according to an exemplary embodiment. A case in which a user performs a function corresponding to a 3-2 sub menu will now be described with reference to FIGS. 13A and 13B.

Referring to FIG. 13A, the device 100 may receive a first drag input that is dragging of a touch tool in a direction in which the 3-2 sub menu is displayed while maintaining contact of the touch tool with respect to a third region on a screen of the device 100. The device 100 may detect a touch-out time when a user lifts a finger from the screen.

Referring to FIG. 13B, the device 100 may unlock a lock screen at the touch-out time. The device 100 may perform the function corresponding to the 3-2 sub menu at the touch-out time.

For example, when the 3-2 sub menu is a game application, the device 100 may execute the game application. When the 3-2 sub menu is a photo folder, the device 100 may display photo content included in the photo folder.

Figure 14A:
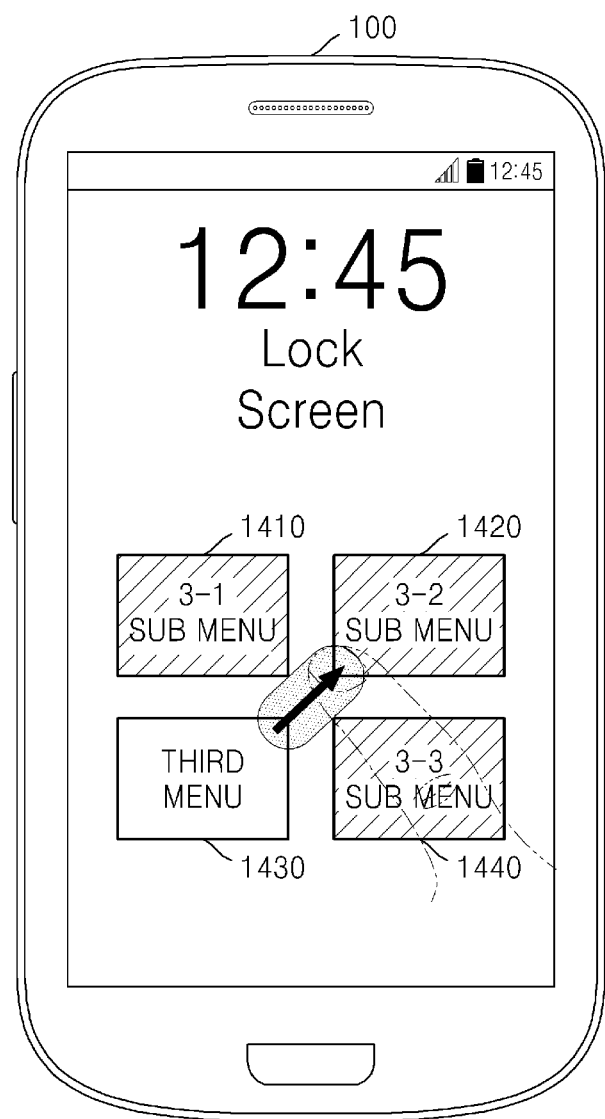
FIGS. 14A and 14B illustrate examples of displaying second layer sub menus corresponding to first layer sub menus according to an exemplary embodiment.
Figure 14B:
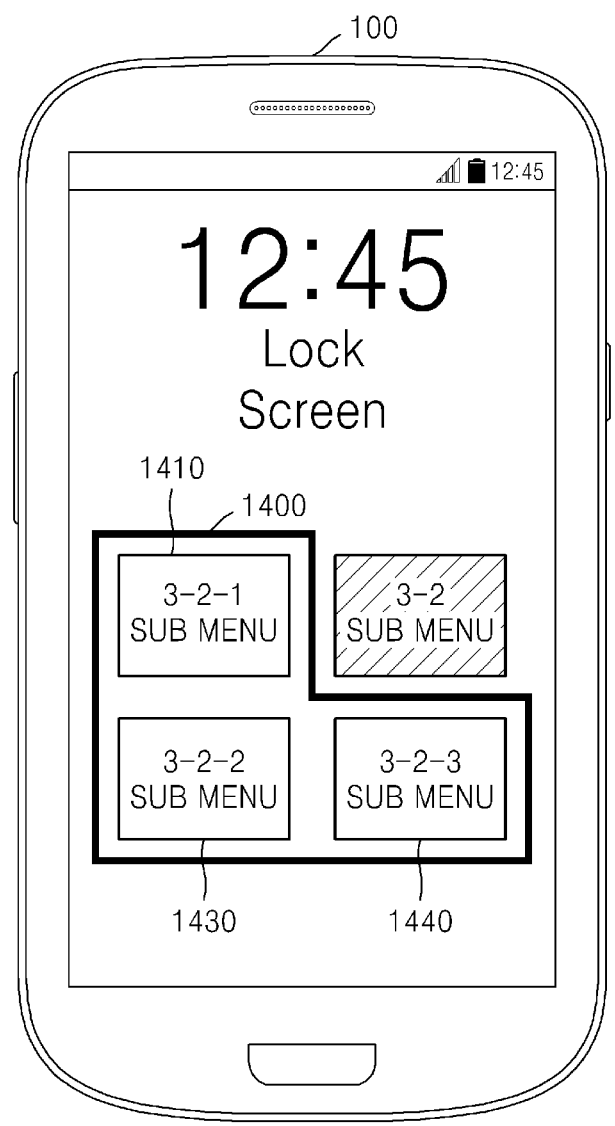

FIGS. 14A and 14B illustrate examples of displaying second layer sub menus corresponding to first layer sub menus according to an exemplary embodiment.

Referring to FIG. 14A, the device 100 may receive a first drag input that is dragging of a touch tool in a direction of a second region 1420 on which a 3-2 sub menu is displayed while maintaining contact of the touch tool with respect to a third region 1430 on a screen of the device 100.

Referring to FIG. 14B, when the device 100 maintains contact of the touch tool with respect to the second region 1420 after the first drag input, the device 100 may display the second layer sub menus corresponding to the 3-2 sub menu on a plurality of regions 1400 other than the second region 1420.

For example, the device 100 may display a 3-2-1 sub menu on a first region 1410, display a 3-2-2 sub menu on the third region 1430, and display a 3-2-3 sub menu on a fourth region 1440.

Meanwhile, the device 100 may receive a second drag input that is dragging of the touch tool in a direction of the third region 1430 on which the 3-2-2 sub menu is displayed from a point where the first drag input ends while maintaining contact of the touch tool with the screen. In this case, the device 100 may display third layer sub menus corresponding to the 3-2-2 sub menu on the first region 1410, the second region 1420, and the fourth region 1440 other than the third region 1430 (not shown).

A method in which the device 100 sets a plurality of menus displayed on a lock screen and sub menus corresponding to each of the plurality of menus will now be described in detail with reference to FIG. 15 below.

Figure 15:
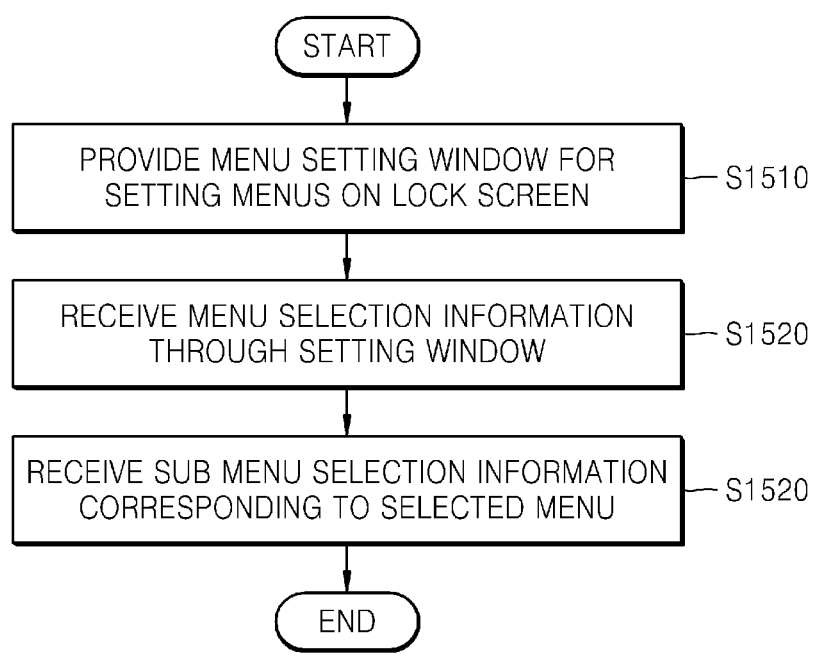
FIG. 15 is a flowchart of a method of setting a plurality of menus and sub menus provided on a lock screen according to an exemplary embodiment.

FIG. 15 is a flowchart of a method of setting a plurality of menus and sub menus provided on a lock screen according to an exemplary embodiment.

In operation S1510, the device 100 according to an exemplary embodiment may provide a menu setting window that may be used to set menus on the lock screen. The menu setting window according to an exemplary embodiment may be in the form of a graphical user interface (GUI).

In operation S1520, the device 100 according to an exemplary embodiment may receive menu selection information through the menu setting window. For example, the device 100 may receive a selection of a menu displayed on each of a plurality of regions included in the lock screen from a user. For example, the device 100 may receive a selection of a list of a plurality of applications as the plurality of menus and a selection of a list of categories used to classify the plurality of applications. As discussed earlier, the categories may include a communication category, a social network service (SNS) category, a media category, a notifications category, and a games category but the categories are not limited thereto.

In operation S1530, the device 100 according to an exemplary embodiment may receive sub menu selection information corresponding to a selected menu.

For example, according to an exemplary embodiment, when the selected menu is a category, the device 100 may receive a selection of at least one application included in the category as sub menus corresponding to the selected menu. When the selected menu is an application, the device 100 may receive a selection of one or more functions of the application as the sub menus corresponding to the selected menu.

An example in which the device 100 according to an exemplary embodiment sets a plurality of menus and sub menus will now be described in detail with reference to FIGS. 16A through 19C below.

Figure 16A:
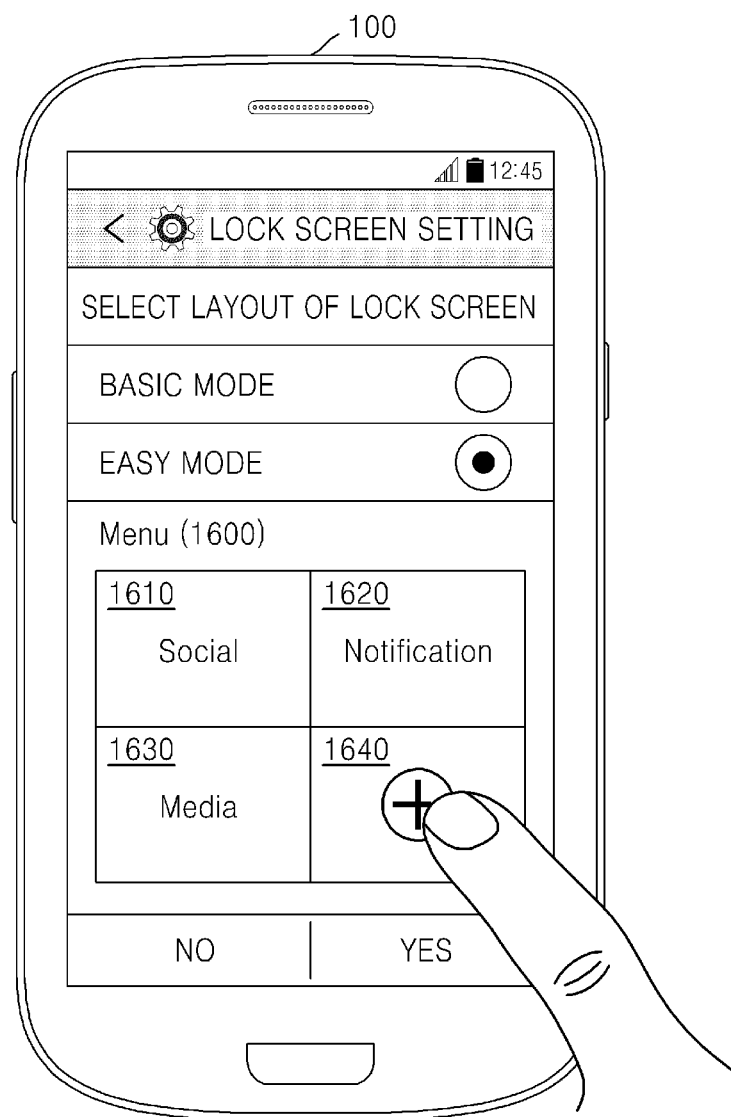
FIGS. 16A and 16B illustrate examples of setting menus displayed on a lock screen according to an exemplary embodiment.
Figure 16B:
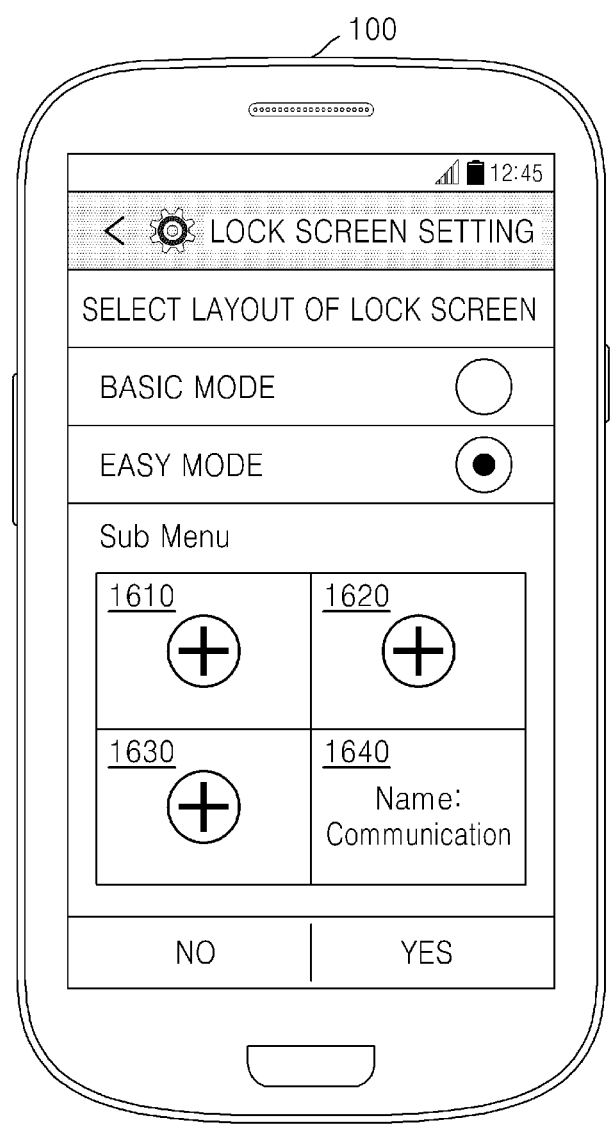

FIGS. 16A and 16B illustrate examples of setting menus displayed on a lock screen according to an exemplary embodiment.

Referring to FIG. 16A, the device 100 may provide a lock screen setting window that may be used to set a layout of the lock screen in environment settings of the device 100. For example, when a user selects an easy mode on the lock screen setting window, the device 100 may provide a menu setting window 1600 that may be used to select the menus displayed on the lock screen.

The device 100 may display a plurality of regions included in the lock screen and a region that may be used to select the menus through the menu setting window 1600. For example, the device 100 may display first through fourth regions 1610, 1620, 1630, and 1640 included in the lock screen. In this regard, the device 100 may display previously selected menus on the first through third regions 1610, 1620, and 1630. The device 100 may display an icon (for example, +) that may be used to add a menu on the fourth region 1640 in which no menu is selected. In this case, the user may add the menu by touching the icon (for example, +) displayed on the fourth region 1640.

Referring to FIG. 16B, when the device 100 receives a touch input with respect to the icon (for example, +) displayed on the fourth region 1640, the device 100 may provide an input window that may be used to input a category name displayed on the fourth region 1640. The device 100 may receive an input of the category name (for example, communication).

Figure 17A:
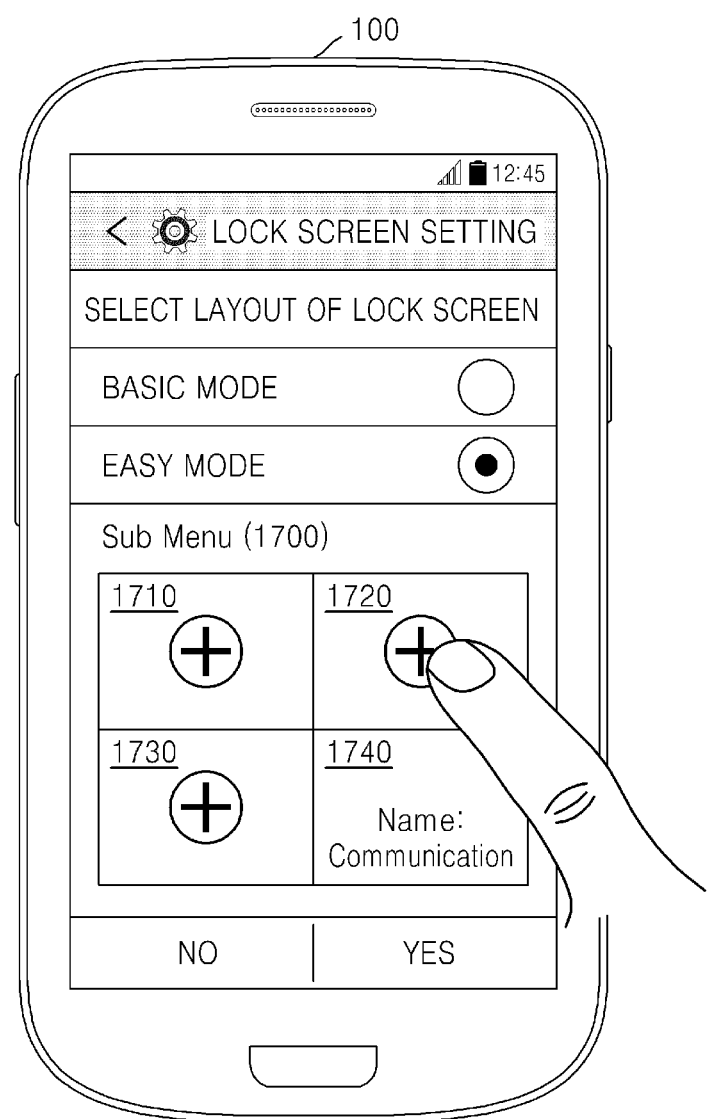
FIGS. 17A and 17B illustrate examples of setting sub menus displayed on a lock screen according to an exemplary embodiment.
Figure 17B:
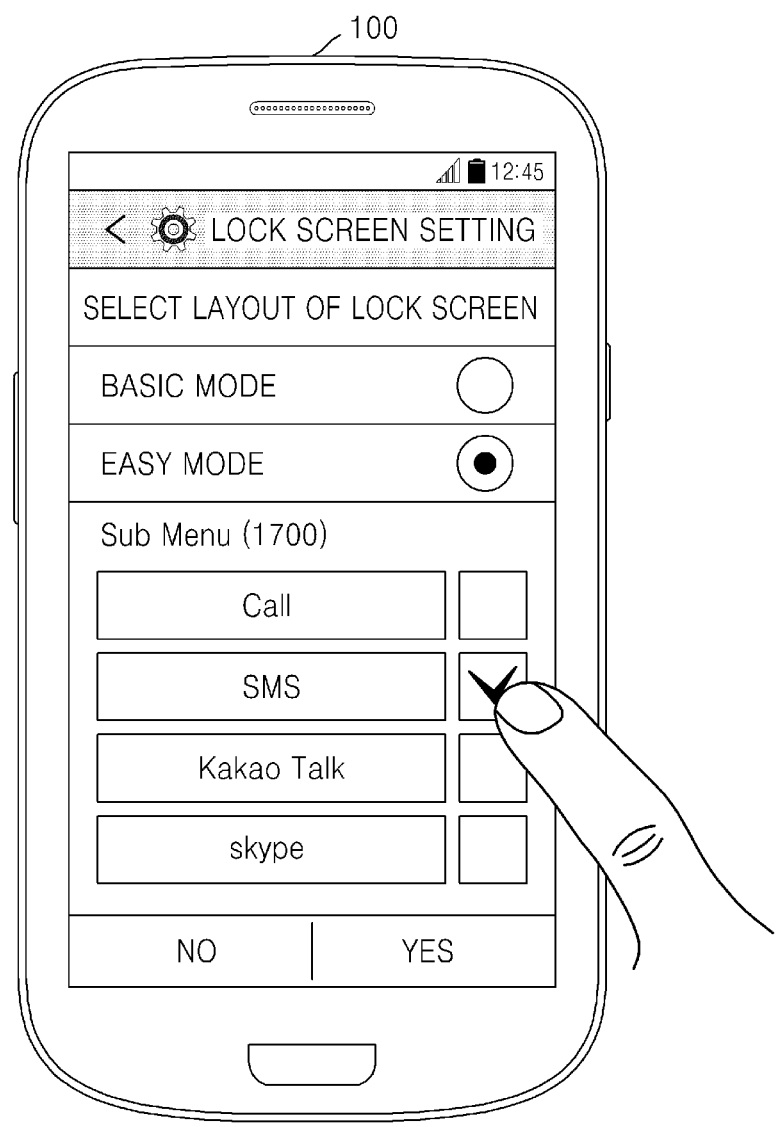
Figure 18:
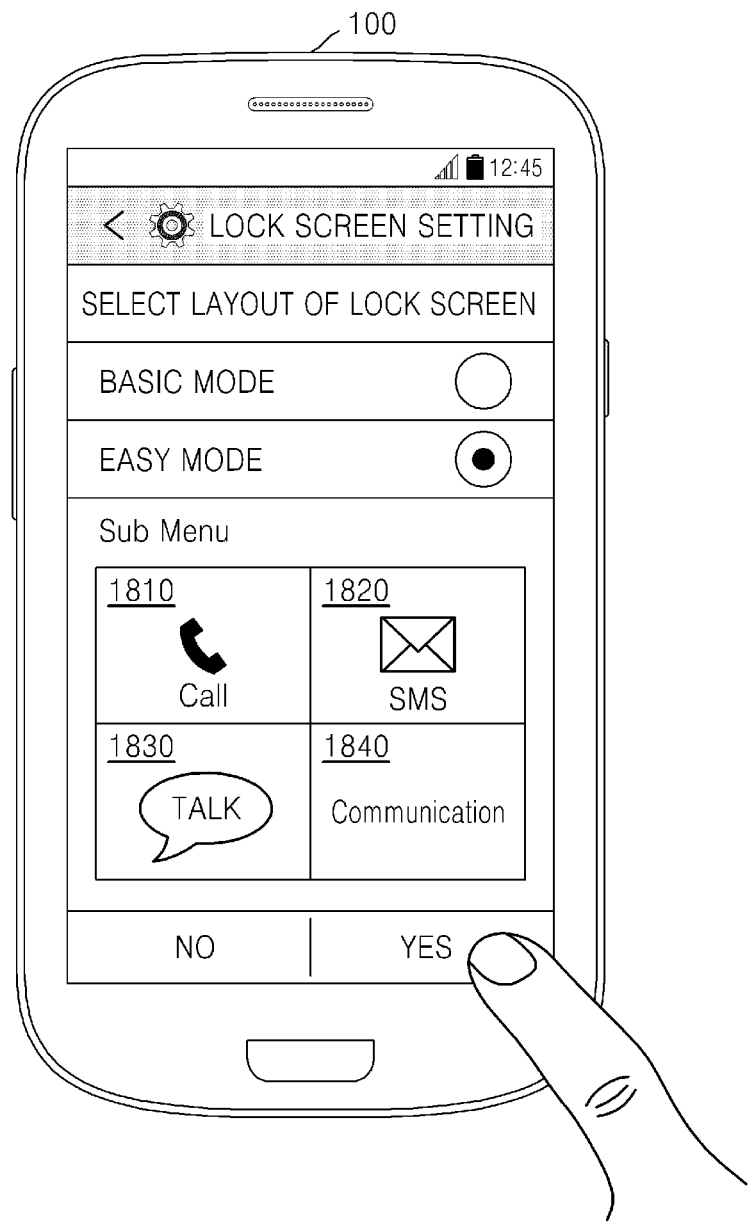
FIG. 18 illustrates another example of setting sub menus displayed on a lock screen according to an exemplary embodiment.

FIGS. 17A-17B and 18 illustrate examples of setting sub menus displayed on a lock screen according to exemplary embodiments.

Referring to FIG. 17A, when a menu (for example, communication) is selected, the device 100 may provide a sub menu selection window 1700 that may be used to select one or more sub menus corresponding to the selected menu. In this regard, the sub menus may be selected with respect to first through third regions 1710, 1720, and 1730 other than a fourth region 1740 on which the selected menu is displayed, from among a plurality of regions 1710, 1720, 1730, and 1740. For example, a user may select sub menus that are to be displayed on the first through third regions 1710, 1720, and 1730.

Referring to FIG. 17B, according to an exemplary embodiment, when the device 100 receives a touch input with respect to an additional icon (for example, +) displayed on the second region 1720, the device 100 may provide a list of applications (for example, Call, SMS, Kakao Talk, Skype, etc.) that may be selected as sub menus.

When the user selects a message application (for example, SMS) from among the list of applications, the device 100 may set the message application as a sub menu displayed on the second region 1720.

Referring to FIG. 18, the device 100 may set a "call application", a "message application", and a "TALK application" as sub menus corresponding to a communication menu based on a user selection. In this regard, a position on which each sub menu is displayed may be determined based on the user selection. For example, the communication menu is displayed on a fourth region 1840, the sub menus (for example, the "call application", the "message application", and the "TALK application") may be set to be displayed on first through third regions 1810, 1820, and 1830 other than the fourth region 1840, respectively.

Figure 19A:
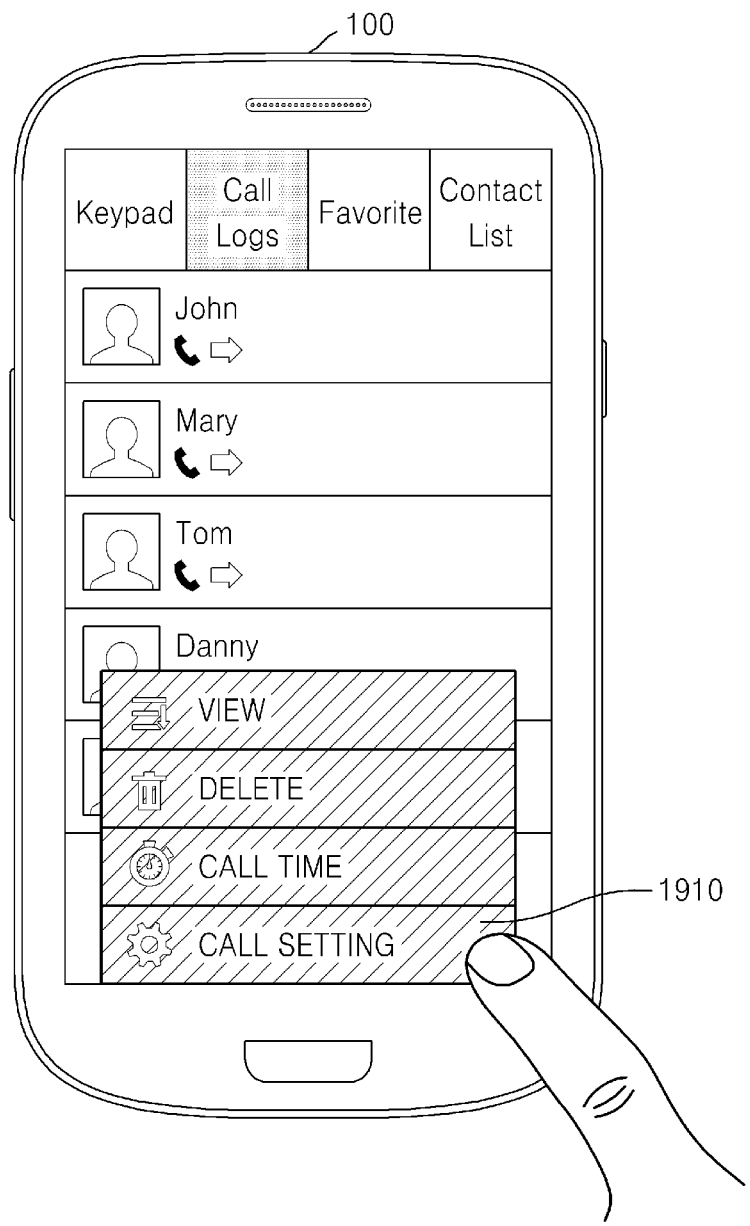
FIGS. 19A through 19C illustrate examples of a setting screen provided by a call application according to an exemplary embodiment.
Figure 19B:
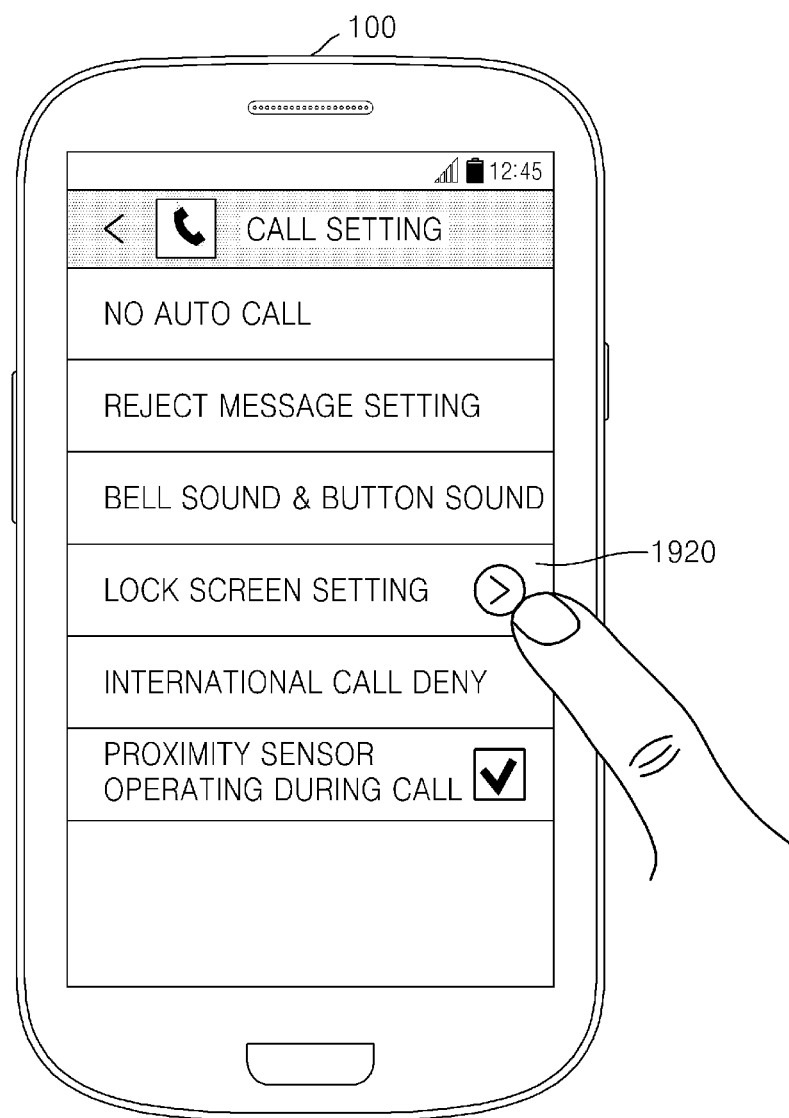
Figure 19C:
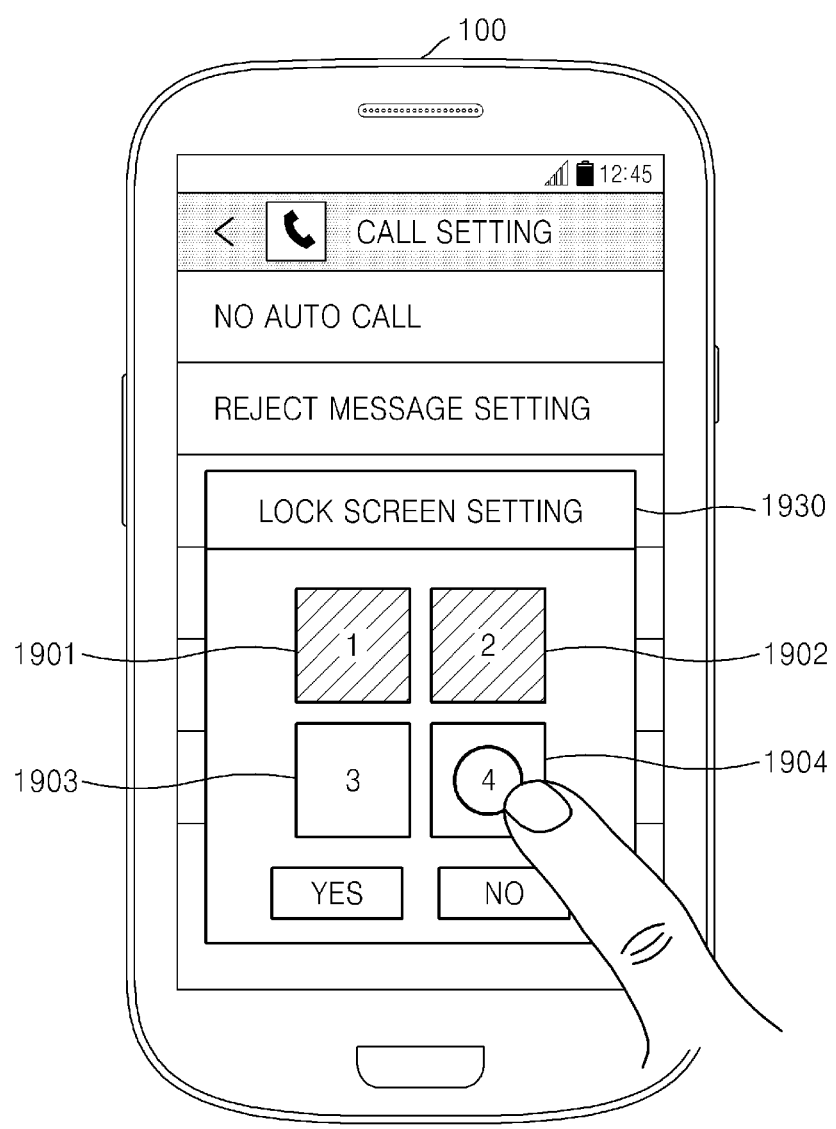

FIGS. 19A through 19C illustrate examples of a setting screen provided by a call application according to an exemplary embodiment.

Referring to FIG. 19A, the device 100 may execute the call application. The device 100 may receive a user selection with respect to a "call setting" button 1910 that may be used to set a function of the call application.

Referring to FIG. 19B, the device 100 may display a list of items that may be optionally set by a user in relation to the call application in response to a selection of the "call setting" button 1910. In this regard, the device 100 may receive a selection of a "lock screen setting" item 1920.

Referring to FIG. 19C, the device 100 may provide a setting window 1930 that may be used to set the call application as one of a plurality of menus displayed on the lock screen in response to a selection of the "lock screen setting" item 1920. In this regard, the device 100 may display a region (for example, a first region 1901 and a second region 1902) including one or more previously set menus. A user may select one of a third region 1903 and a fourth region 1904 which do not include a previously set menu. For example, when the user selects the fourth region 1904, the device 100 may display the call application on the fourth region 1904 from among a plurality of regions on the lock screen.

FIGS. 20A through 20D illustrate examples in which the device 100 provides a plurality of menus, first layer sub menus, and second layer sub menus on a lock screen according to an exemplary embodiment.

Figure 20A:
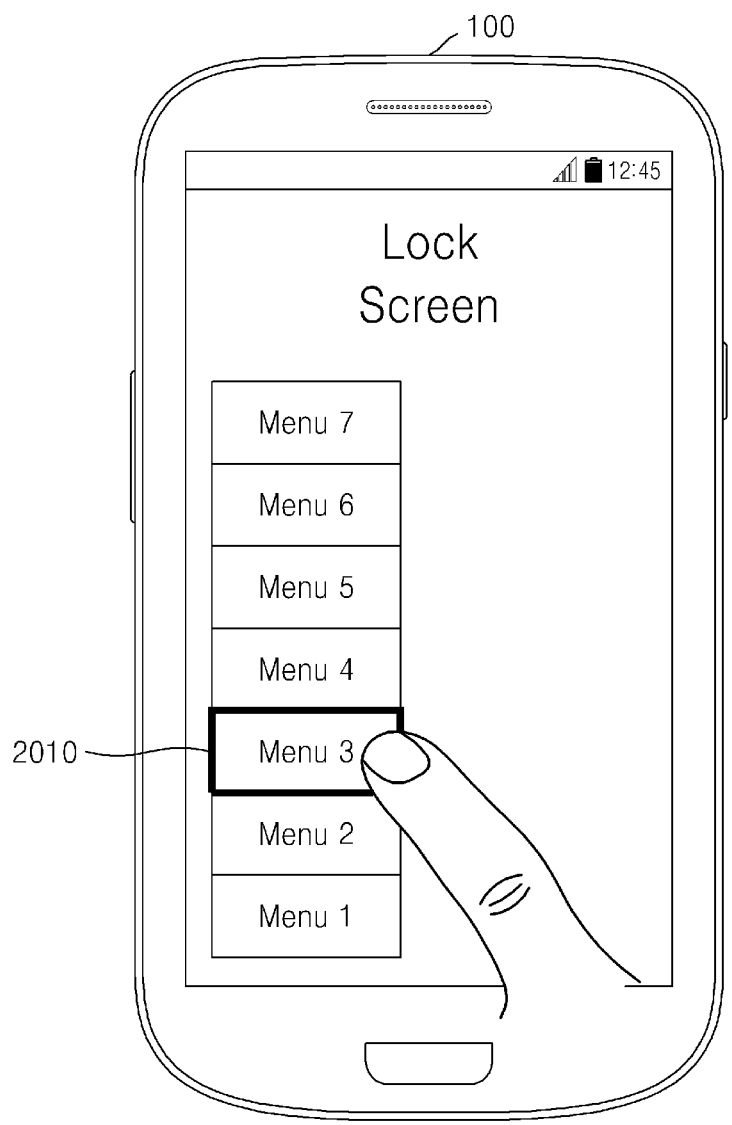
FIGS. 20A through 20D illustrate examples in which a device provides a plurality of menus, first layer sub menus, and second layer sub menus on a lock screen according to an exemplary embodiment.

Referring to FIG. 20A, the device 100 according to an exemplary embodiment may display the plurality of menus on a lock screen. For example, the device 100 may display first through seventh menus on the lock screen. A user may scroll through the plurality of menus displayed on the lock screen by moving a touch tool (for example, a finger or an electronic pen) in upper and lower directions while touching the touch tool on the lock screen. In this regard, the device 100 may provide a feedback signal regarding boundaries of the plurality of menus. The feedback signal may include at least one of a video signal, an audio signal, and a vibration signal.

For example, when the user drags a first menu upward after touching the first menu, the device 100 may provide the vibration signal in a boundary between the first menu and a second menu, a boundary between the second menu and a third menu, a boundary between the third menu and a fourth menu, etc. The user may determine that a menu that is touched is changed based on the feedback signal.

The device 100 according to an exemplary embodiment may receive a touch input with respect to a third menu 2010 from among the plurality of menus.

Figure 20B:
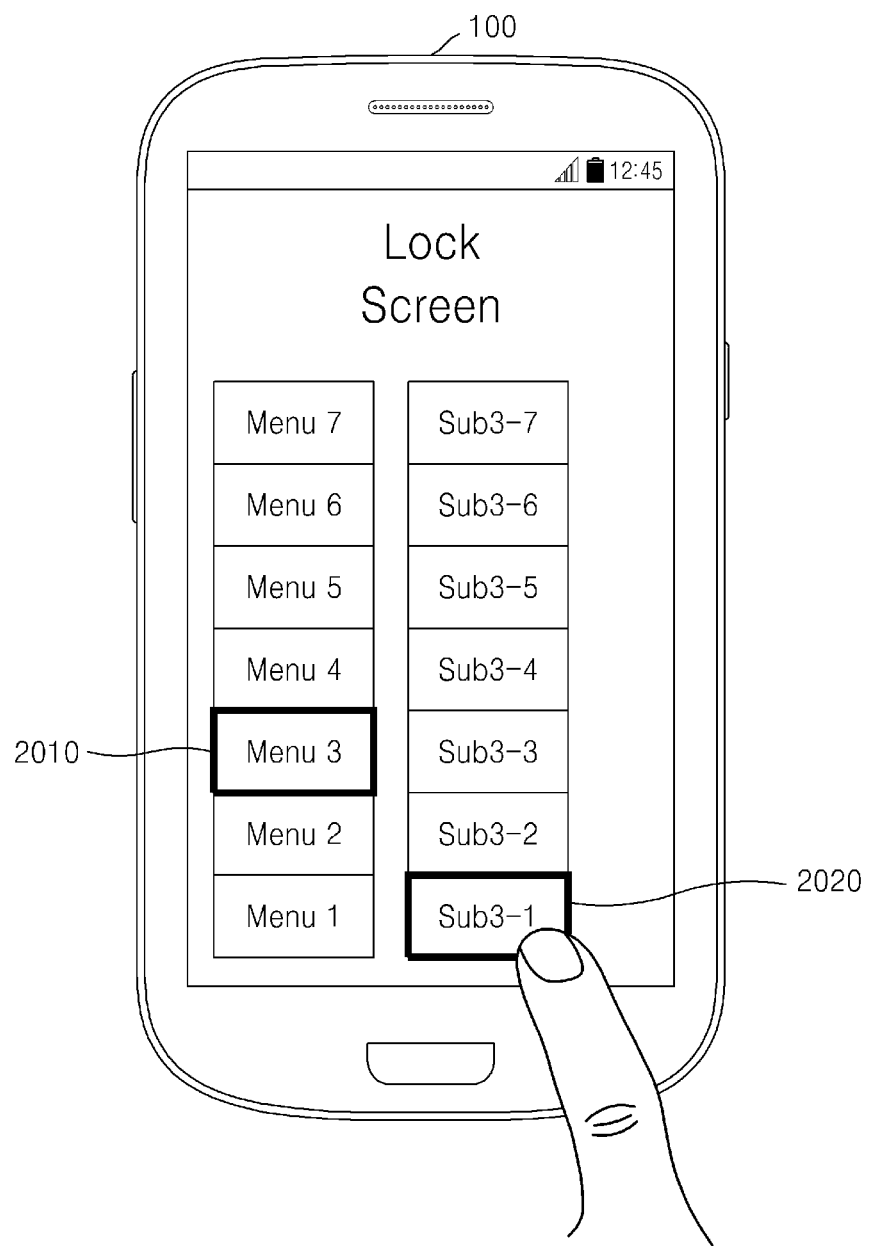

Referring to FIG. 20B, the device 100 displays one or more first layer sub menus corresponding to the third menu 2010 according to the touch input with respect to the third menu 2010. For example, the device 100 may display a 3-1 sub menu 2020, a 3-2 sub menu, a 3-3 sub menu, a 3-4 sub menu, a 3-5 sub menu, a 3-6 sub menu, and a 3-7 sub menu.

The device 100 may receive a first drag input that is dragging of the touch tool in a direction in which the 3-1 sub menu 2020 is displayed while maintaining contact of the touch tool with the screen after receiving the touch input with respect to the third menu 2010. In this regard, the user may scroll through a plurality of sub menus corresponding to the third menu 2010 by moving the touch tool in upper and lower directions while maintaining contact of the touch tool. In this regard, the device 100 may provide the feedback signal regarding boundaries of the plurality of sub menus.

Figure 20C:
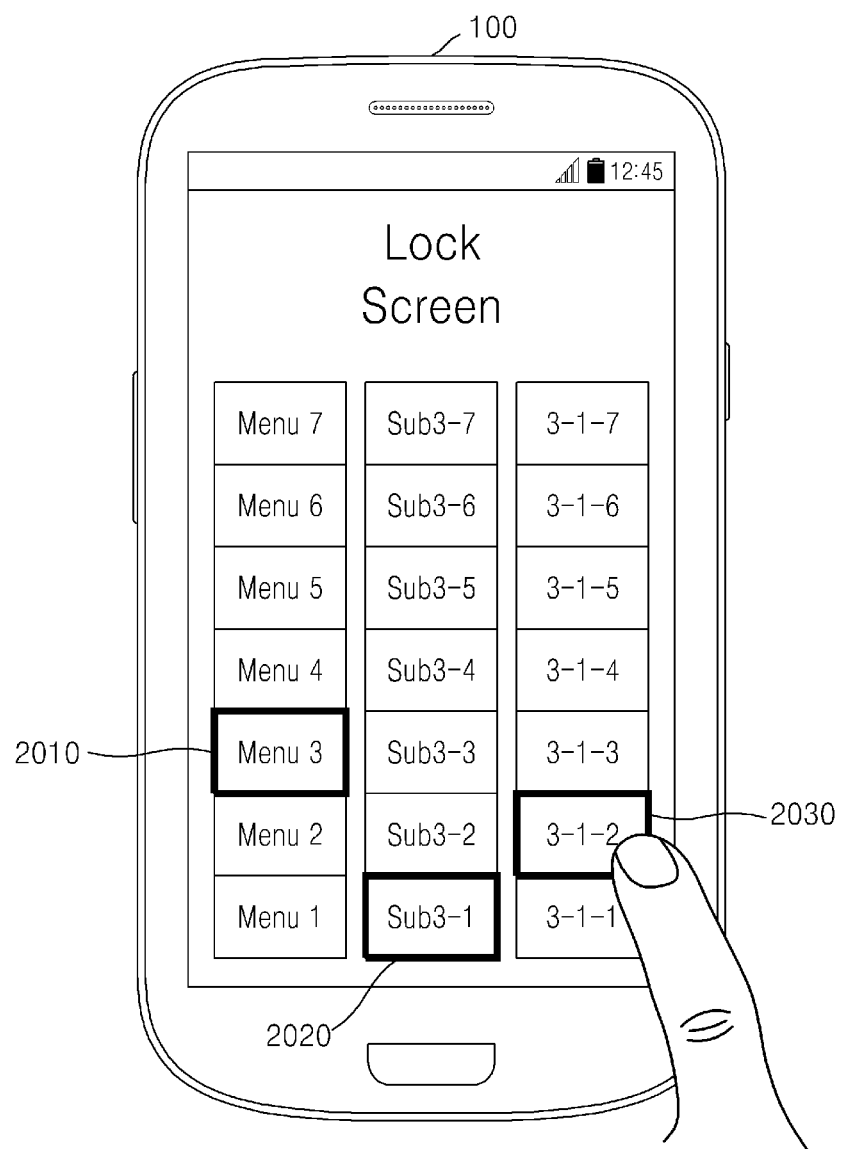

Referring to FIG. 20C, the device 100 may display one or more second layer sub menus corresponding to the 3-1 sub menu 2020 based on the first drag input. For example, the device 100 may display a 3-1-1 sub menu, a 3-1-2 sub menu 2030, a 3-1-3 sub menu, a 3-1-4 sub menu, a 3-1-5 sub menu, a 3-1-6 sub menu, and a 3-1-7 sub menu.

According to an exemplary embodiment, the device 100 may receive a second drag input that is dragging of the touch tool in a direction in which the 3-1-2 sub menu 2030 is displayed while maintaining contact of the touch tool with the screen after receiving the first drag input in the direction in which the 3-1 sub menu 2020 is displayed. In this regard, the device 100 may determine that the user selects the 3-1-2 sub menu 2030 at a touch-out time.

According to another exemplary embodiment, when the user double taps a region on which the 3-1-2 sub menu 2030 is displayed after dragging the touch tool in the direction in which the 3-1-2 sub menu 2030 is displayed while maintaining contact of the touch tool, the device 100 may determine that the user selects the 3-1-2 sub menu 2030.

Figure 20D:
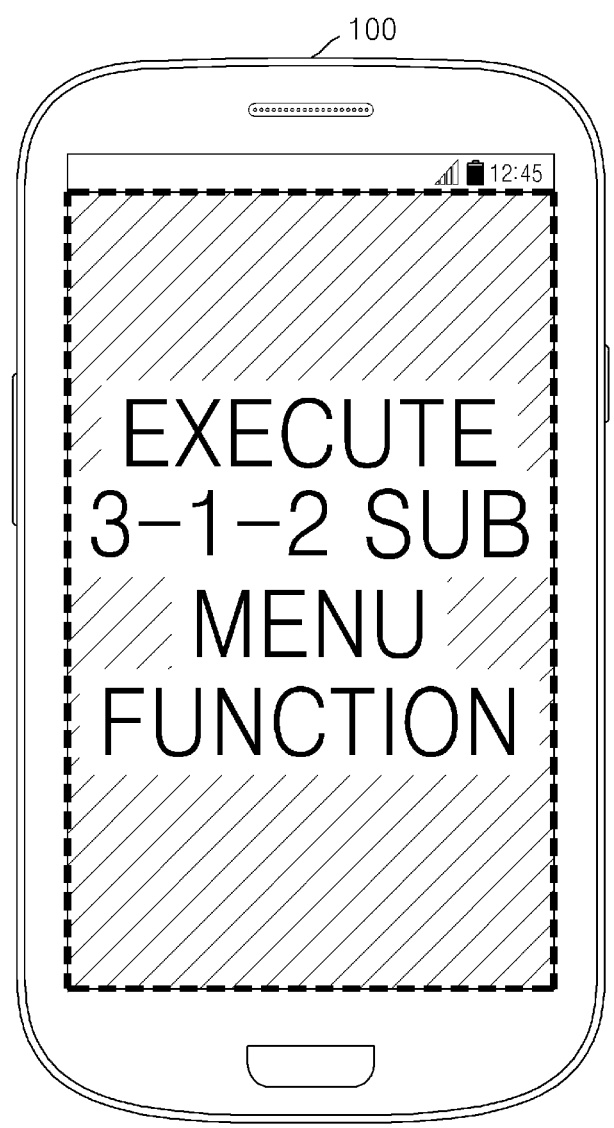

Referring to FIG. 20D, the device 100 may perform a function corresponding to the 3-1-2 sub menu 2030 based on the second drag input or a double tap input. For example, the device 100 may unlock the lock screen and execute an application corresponding to the 3-1-2 sub menu 2030.

Figure 21:
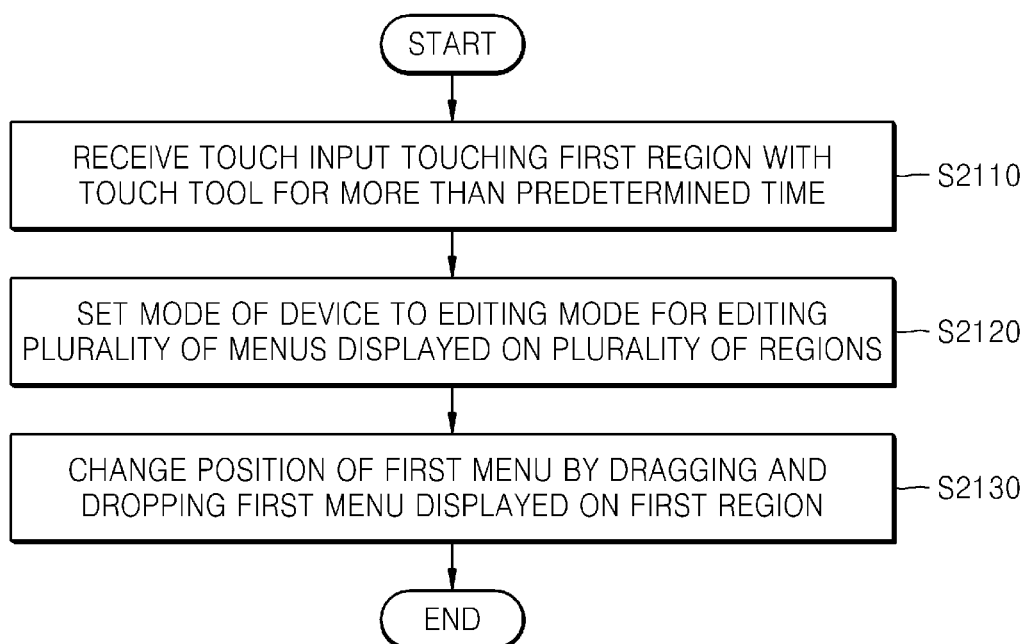
FIG. 21 is a flowchart of a method in which a device provides an editing mode with respect to a plurality of menus displayed on a lock screen according to an exemplary embodiment.

FIG. 21 is a flowchart of a method in which the device 100 provides an editing mode with respect to a plurality of menus displayed on a lock screen according to an exemplary embodiment.

In operation S2110, the device 100 according to an exemplary embodiment may receive a touch input touching a first region from among a plurality of regions included in the lock screen (of the device 100) with the touch tool for more than a predetermined time (for example, for more than 3 seconds).

In operation S2120, the device 100 may set a mode of the device 100 to the editing mode that may be used to edit the plurality of menus displayed on the plurality of regions based on the touch input with the touch tool contacting the first region for more than the predetermined time (for example, for more than 3 seconds).

According to an exemplary embodiment, the editing may include a user deleting menus displayed on the first region, moving positions of the menus displayed on the first region, and changing names of the menus displayed on the first region.

In operation S2130, the device 100 according to an exemplary embodiment may change a position of a first menu displayed on the first region since the first menu is dragged and dropped. The device 100 according to an exemplary embodiment may change alignment positions of the plurality of menus since the position of the first menu is changed. For example, since the position of the first menu is changed, alignment positions of second through fourth menus may be changed. This will be described in more detail with reference to FIGS. 22A through 22C below.

Figure 22A:
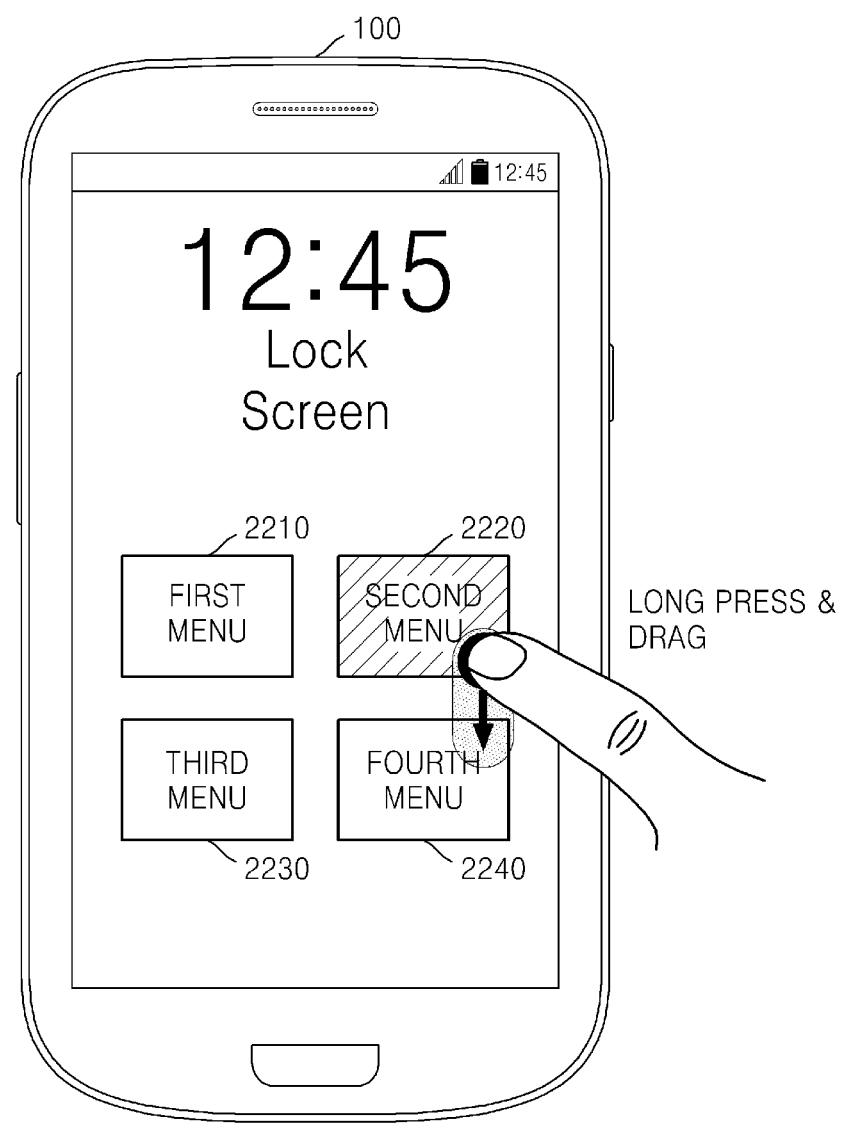
FIGS. 22A through 22C illustrate examples in which a device changes positions of a plurality of menus based on a touch input with respect to a lock screen according to an exemplary embodiment.
Figure 22B:
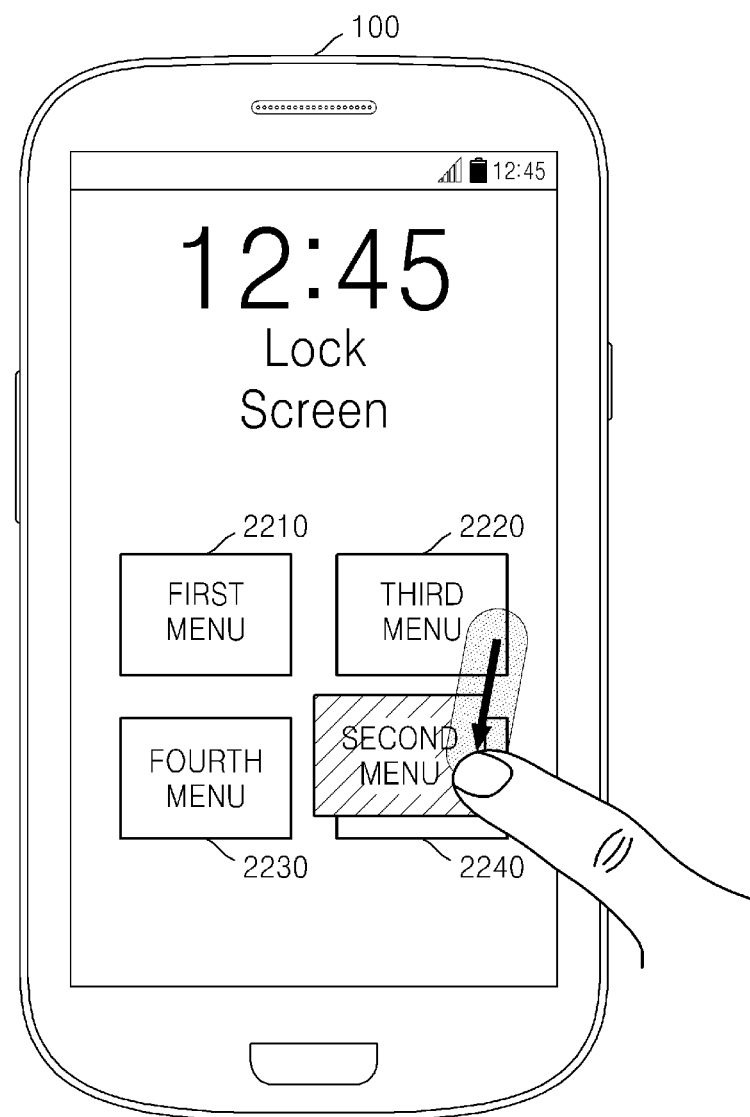
Figure 22C:
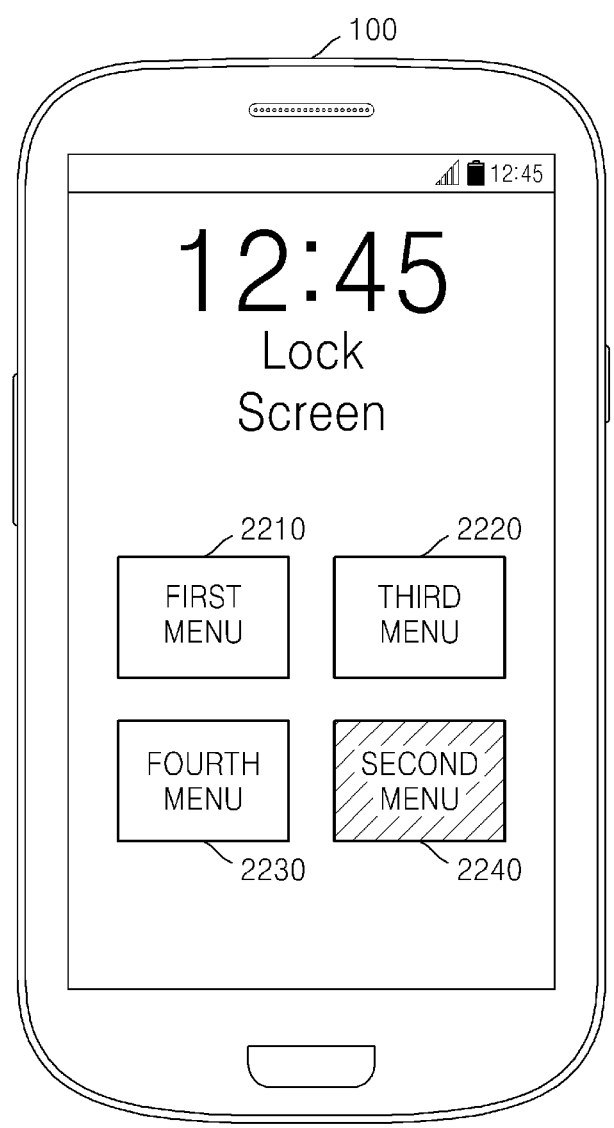

FIGS. 22A through 22C illustrate examples in which the device 100 changes positions of a plurality of menus based on a touch input with respect to a lock screen according to an exemplary embodiment.

Referring to FIG. 22A, the device 100 may display the plurality of menus (for example, first through fourth menus) on a plurality of regions (e.g., first region 2210, second region 2220, third region 2230, and fourth region 2240) on the lock screen. The device 100 may detect a touch input via the touch tool with respect to the second menu displayed on the second region 2220 or the second region 2220 for more than a predetermined time (for example, for more than 3 seconds). In response, the device 100 may provide an editing mode that may be used to move the second menu.

Referring to FIG. 22B, when a user drags the touch tool in a fourth region 2240 on which the fourth menu is displayed while maintaining contact of the touch tool with the screen, the device 100 may move the second menu to the fourth region 2240 based on a user drag input.

Referring to FIG. 22C, since the second menu moves to the fourth region 2240, the device 100 may move the third menu to the second region 2220 and the fourth menu to a third region 2230.

According to another exemplary embodiment, since the second menu moves to the fourth region 2240, the device 100 may move the fourth menu to the second region 2220.

Figure 23:
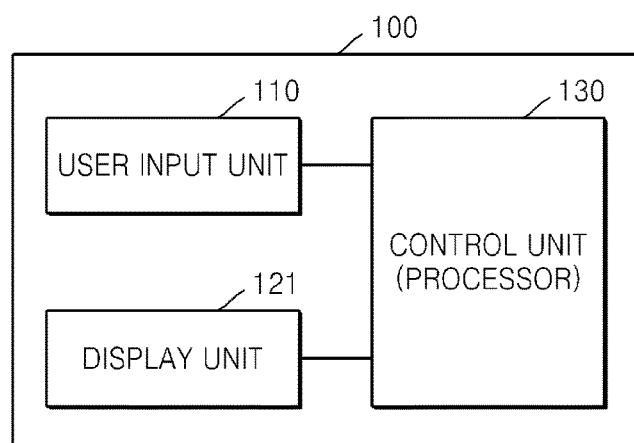
FIG. 23 is a block diagram of a device according to an exemplary embodiment.
Figure 24:
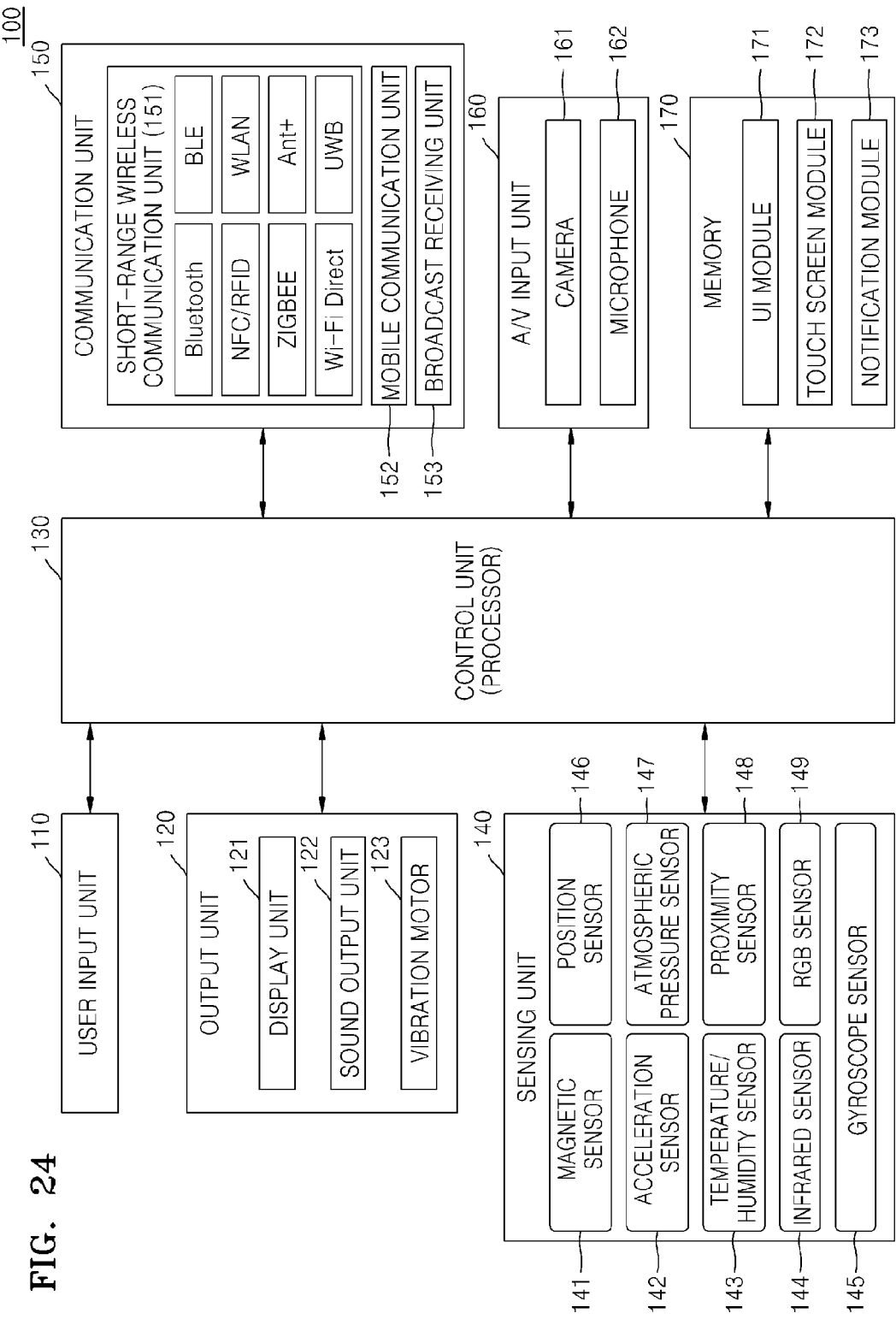
FIG. 24 is a block diagram of a device according to an exemplary embodiment.

FIGS. 23 and 24 are block diagrams of the device 100 according to exemplary embodiments.

Referring to FIG. 23, the device 100 may include a user input unit 110, a display unit (i.e., a display) 121, and a control unit (i.e., a controller or a processor) 130. However, the device 100 may be implemented with more or less elements than the elements of FIG. 23.

For example, referring to FIG. 24, the device 100 according to an exemplary embodiment may further include an output unit 120, a sensing unit 140, a communication unit 150, an audio/video (A/V) input unit 160, and a memory 170, in addition to the user input unit 110, the display 121 (included in the output unit 120), and the controller 130.

The above elements will now be described below.

The user input unit 110 may be a unit by which the user inputs data so as to control the device 100. For example, the user input unit 110 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but is not limited thereto.

The user input unit 110 may receive a user touch input with respect to a lock screen, and receive a first drag input that is dragging of the touch tool in a direction in which a first menu is displayed from among a plurality of menus while maintaining contact of the touch tool with the screen. The user input unit 110 may receive a selection of a user with respect to a first sub menu from among one or more first layer sub menus.

The user input unit 110 may receive a second drag input that is dragging of the touch tool in a direction in which the first sub menu is displayed from a point where the first drag input ends while maintaining contact of the touch tool with the screen and a double tap input with respect to the first sub menu.

The user input unit 110 may receive a second drag input that is dragging of the touch tool in the direction in which the first sub menu is displayed from among the one or more first layer sub menus from the point where the first drag input ends while maintaining contact of the touch tool with the screen.

The user input unit 110 may receive a user touch input with respect to a first region from among a plurality of regions included in the lock screen, and receive a first drag input that is dragging of the touch tool in a second region from among the plurality of regions while maintaining contact of the touch tool with the screen after receiving the user touch input with respect to the first region. The user input unit 110 may receive a second drag input that is dragging of the touch tool in a third region on which the first sub menu from among the one or more first layer sub menus from a point where the first drag input ends while maintaining contact of the touch tool with the screen after receiving the first drag input.

The user input unit 110 may receive a touch input touching the first region from among the plurality of regions with the touch tool for more than a predetermined time with respect to the first region. According to exemplary embodiments, the touch input that is maintained for more than the predetermined time with respect to the first region may be expressed as a touch input that is maintained for more than a predetermined time with respect to a menu displayed on the first region.

The output unit 120 may function to output an audio signal, a video signal, or a vibration signal and may include a display 121, a sound output unit 122, a vibration motor 123, etc.

The display 121 displays and outputs information that is processed in the device 100. For example, the display 121 may display the plurality of menus or a plurality of sub menus on the lock screen.

The display 121 may display the plurality of menus within a predetermined distance from a region in which the touch input is received according to the touch input. The display 121 may display the one or more first layer sub menus corresponding to the first menu within a predetermined distance from a region on which the first menu is displayed based at least in part on the moving direction information of the first drag input.

The display 121 may display one or more second layer sub menus corresponding to the first sub menu within a predetermined distance from a region on which the first sub menu is displayed based at least in part on the moving direction information of the second drag input. The display 121 may display the one or more first layer sub menus on a region that does not include a moving path of the first drag input from among the plurality of regions.

The display 121 may display the plurality of menus on the plurality of regions and display the one or more first layer sub menus corresponding to the first menu on the plurality regions other than the first region according to a user touch input with respect to the first region. The display 121 may display the one or more second layer sub menus corresponding to the first sub menu on the plurality regions other than the third region where the first sub menu is displayed.

When the display 121 and a touch pad form a layer structure and then are formed as a touch screen, the display 121 may be used as both an output device and input device. The display 121 may include at least one of a liquid crystal display (LCD), a thin film transistor-liquid crystal display (TFT-LCD), an organic light-emitting diode (OLED) display, a flexible display, a 3D display, and an electrophoretic display. Also, according to a type of the device 100, the device 100 may include two or more displays 121. In this regard, the two or more displays 121 may face each other by using a hinge.

The sound output unit 122 may output audio data that is received from the communication unit 110 or is stored in the memory 170. The sound output unit 122 may also output a sound signal (e.g., a call signal receiving sound, a message receiving sound, a notification sound, etc.) related to functions performed by the device 100. The sound output unit 122 may include a speaker, a buzzer, etc.

The vibration motor 123 may output a vibration signal. For example, the vibration motor 123 may output the vibration signal that corresponds to an output of the audio data (e.g., the call signal receiving sound, the message receiving sound, etc.) or video data. Also, when a touch is input to the touch screen, the vibration motor 123 may output a vibration signal.

The controller 130 may generally control all operations of the device 100. That is, the controller 130 may execute programs stored in the memory 170 and accordingly may control the user input unit 110, the output unit 120 including the display 121, the controller 130, the sensing unit 140, the communication unit 150, the A/V input unit 160, and the memory 170, etc.

The controller 130 may extract one or more previously determined first layer sub menus corresponding to the first menu. The controller 130 may perform a function corresponding to the first sub menu selected from the one or more first layer sub menus. For example, the controller 130 may perform the function corresponding to the first sub menu according to the double tap input. In this regard, the controller 130 may unlock the lock screen in response to the double tap input. The controller 130 may execute an application corresponding to the selected first sub menu or perform a function included in the application.

The controller 130 may set the plurality of menus and sub menus corresponding to each of the plurality of menus. The controller 130 may perform functions corresponding to the first layer sub menus displayed on the second region according to the first drag input. For example, the controller 130 may execute an application displayed on the second region or perform a predetermined function of the application at a touch-out time.

The controller 130 may be switched to an editing mode that may be used to edit the plurality of menus displayed on the plurality of regions based on a touch input touching the lock screen with the touch tool for more than a predetermined time. For example, the controller 130 may change a position of the first menu since the first menu displayed on the first region is dragged and dropped. The controller 130 may change alignment positions of the plurality of menus since the position of the first menu is changed.

The sensing unit 140 may detect a state of the device 100 or a state of the periphery of the device 100 and transfer detected information to the controller 130.

The sensing unit 140 may include at least one of a magnetic sensor 141, an acceleration sensor 142, a temperature/humidity sensor 143, an infrared ray sensor 144, a gyro sensor 145, a positioning sensor (for example, a global positioning system (GPS) 146, an atmospheric pressure sensor 147, a proximity sensor 148, and an RGB (illumination) sensor 149, but is not limited thereto. One of ordinary skill in the art may intuitively infer a function of each sensor from its title, and thus a detailed description thereof is omitted here.

The communication unit 150 may include one or more elements for allowing communication between the device 100 and an external device or between the device 100 and a server. For example, the communication unit 150 may include a short-range wireless communication unit 151, a mobile communication unit 152, and a broadcasting receiving unit 153.

The short-range wireless communication unit 151 may include a Bluetooth communication unit, a Bluetooth low energy (BLE) communication unit, a near field communication unit, a wireless LAN (Wi-Fi) communication unit, a ZigBee communication unit, an infrared data association (IrDA) communication unit, a Wi-Fi Direct (WFD) communication unit, a ultra wideband (UWB) communication unit, an Ant+ communication unit, etc., but is not limited thereto.

The mobile communication unit 152 transmits and receives a wireless signal with at least one of a base station, an external terminal, a server, etc. over a mobile communication network. In this regard, the wireless signal may include a voice call signal, a conference call signal, or diverse types of data according to transmission and reception of text/multimedia messages.

The broadcasting receiving unit 153 receives a broadcasting signal and/or information relating to broadcasting from the outside over a broadcasting channel. The broadcasting channel may include a satellite channel and a terrestrial channel. In certain exemplary embodiments, the device 100 may not include the broadcasting receiving unit 153.

The A/V input unit 160 is used to input an audio signal or a video signal and may include a camera 161 and a microphone 162. The camera 161 may obtain an image frame such as a still image or a moving image through an image sensor in a conference call mode or a photographing mode. An image captured by the image sensor may be processed by the controller 130 or an image processing unit (not shown).

The image frame processed by the camera 161 may be stored in the memory 170 or may be transmitted to the outside through the communication unit 150. Two or more cameras 161 may be included according to a configuration type of the device 100.

The microphone 162 receives an external sound signal and processes the external sound signal as electrical voice data. For example, the microphone 162 may receive the external sound signal from the external device or a speaker. The microphone 162 may use diverse noise removal algorithms for removing noise that occurs when receiving the external sound signal.

The memory 170 may store a program to process and to control the controller 130, or may store a plurality of pieces of data (for example, a plurality of menus, a plurality of first layer sub menus corresponding to each of the plurality of menus, a plurality of second layer sub menus corresponding to each of the plurality of first layer sub menus, etc.) that are input/output.

The memory 170 may include at least one storage medium from among a flash memory-type storage medium, a hard disk-type storage medium, a multimedia card micro-type storage medium, card-type memories (e.g., an SD card, an XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. The device 100 may operate web storage or a cloud server that performs a storing function of the memory 170 via the Internet.

The programs stored in the memory 170 may be classified into a plurality of modules according to their functions, for example, into a UI module 171, a touch screen module 172, a notification module 173, etc.

The UI module 171 may provide a UI or GUI which are synchronized with the device 100 and specialized according to applications. The touch screen module 172 may detect a user touch gesture on the touch screen and may transmit information regarding the touch gesture to the controller 130. The touch screen module 172 according to an exemplary embodiment may recognize and analyze a touch code. The touch screen module 172 may be configured as separate hardware including a controller.

As discussed above, various sensors may be provided in or near the touch screen to detect a user touch input on the touch screen. For example, a tactile sensor may be provided to detect the user touch input. The tactile sensor detects a contact of a specific object at least as sensitively as a person can detect similar contact. The tactile sensor may detect various types of information such as the roughness of a contact surface, the hardness of the contact object, the temperature of a contact point, or the like.

Further, as discussed above, another example of a sensor to detect the touch input on the touch screen is a proximity sensor. The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor.

The notification module 173 may generate a signal for notifying an occurrence of an event of the device 100. Examples of the event that occurs in the device 100 may include a call signal reception, a message reception, a key signal input, a schedule notification, etc. The notification module 173 may output a notification signal in a video signal form through the display 121, in an audio signal form through the sound output unit 122, and in a vibration signal form through the vibration motor 123.

The notification module 173 according to an exemplary embodiment may provide a feedback signal regarding boundaries of the plurality of menus. The feedback signal may include at least one of the video signal, the audio signal, and the vibration signal. For example, when the user drags a first menu upward after touching the first menu, the device may provide the vibration signal in a boundary between the first menu and a second menu, in a boundary between the second menu and a third menu, in a boundary between the third menu and a fourth menu, etc. The user may determine that a touched menu is changed based on the feedback signal.

As described above, a device 100 according to the one or more of the above exemplary embodiments may detect a user touch input with respect to menus and sub menus displayed on a lock screen, which allows a user to quickly access a specific function provided by the device 100.

The device 100 according to an exemplary embodiment may allow the user who is unable to clearly view a screen (for example, the user is visually impaired or is in a meeting) to unlock the lock screen through a touch input (for example, a drag input and a double tap input) with respect to the lock screen and quickly access the specific function provided by the device 100.

One or more exemplary embodiments can also be implemented through computer-readable code/instructions in/on a medium, e.g., a computer-readable medium, to control at least one processing element to implement any above-described exemplary embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method, performed by a device, of providing a menu interface, the method comprising:
    displaying, on a lock screen of the device, a first level of the menu interface, the first level of the menu interface comprising a first plurality of menu items respectively displayed on a plurality of regions on the lock screen, wherein the plurality of regions on the lock screen are predetermined by splitting the lock screen;
    receiving a touch input on a first region among the plurality of regions on which the first plurality of menu items are displayed;
    in response to the touch input on the first region, displaying a second level of the menu interface while displaying a first menu item on the first region, the second level of the menu interface comprising a second plurality of menu items corresponding to the first menu item, each of the second plurality of menu items being displayed on a corresponding region of the plurality of regions on which the first plurality of menu items were displayed other than the first region;
    receiving a first drag input on a second region, among the plurality of regions other than the first region, in a direction from the first region to the second region;
    in response to the first drag input on the second region, displaying a third level of the menu interface while displaying a second menu item on the second region, the third level of the menu interface comprising a third plurality of menu items corresponding to the second menu item, each of the third plurality of menu items being displayed on a corresponding region of the plurality of regions on which the first plurality of menu items were displayed other than the second region; and
    performing a function corresponding to a menu item among the third plurality of menu items.

2. The method of claim 1, wherein the performing the function comprises unlocking the lock screen.

3. The method of claim 1, wherein the method further comprises:
    receiving a second drag input in a direction of a region, among the plurality of regions on which a third menu item, among the third plurality of menu items, is displayed; and
    displaying, on the plurality of regions other than the region on which the third menu item is displayed, a fourth level of the menu interface, the fourth level of the menu interface comprising a fourth plurality of menu items included in the third menu item.

4. The method of claim 1, further comprising:
    setting the first plurality of menu items and a respective second plurality of menu items corresponding to each of the set first plurality of menu items.

5. The method of claim 1, further comprising:
    receiving a touch input on the first region for more than a first time; and
    setting, based on the received touch input, a mode of the device to an editing mode for editing the first plurality of menu items respectively displayed on the plurality of regions.

6. The method of claim 5, wherein the setting of the mode of the device to the editing mode comprises:
changing a position of the first menu item in response to dragging and dropping of the first menu item displayed on the first region to another region on the lock screen.

7. The method of claim 6, wherein the setting of the mode of the device to the editing mode further comprises:
changing alignment positions of the first plurality of menu items, other than the first menu item, in response to changing the position of the first menu item.

8. A device comprising:
a user input unit configured to receive a touch input on a first region among a plurality of regions included on a lock screen of the device, and receive a first drag input on a second region, among the plurality of regions other than the first region, in a direction from the first region to the second region, wherein the plurality of regions on the lock screen are predetermined by splitting the lock screen;
a display configured to display, on the lock screen, a first level of a menu interface, the first level of the menu interface comprising a first plurality of menu items respectively displayed on the plurality of regions on the lock screen, and, in response to the touch input on the first region, display a second level of the menu interface while displaying a first menu item on the first region, the displayed second level of the menu interface comprising a second plurality of menu items corresponding to the first menu item, each of the second plurality of menu items being displayed on a corresponding region of the plurality of regions on which the first plurality of menu items were displayed other than the first region, and wherein the display is further configured to, in response to the first drag input on the second region, display a third level of the menu interface while displaying a second menu item on the second region, the third level of the menu interface comprising a third plurality of menu items corresponding to the second menu item, each of the third plurality of menu items being displayed on a corresponding region of the plurality of regions on which the first plurality of menu items were displayed other than the second region; and
a controller configured to perform a function corresponding to a menu item among the third plurality of menu items.

9. The device of claim 8, wherein the controller is configured to unlock the lock screen as the function corresponding to the second menu item.

10. The device of claim 8, wherein
the user input unit is configured to receive a second drag input in a direction of a region, among the plurality of regions, on which a third menu item, among the third plurality of menu items, is displayed, and
the display is configured to display, on the plurality of regions other than the region on which the third menu item is displayed, a fourth level of the menu interface, the fourth level of the menu interface comprising a fourth plurality of menu items included in the third menu item.

11. The device of claim 8, wherein the controller is configured to set the first plurality of menu items and a respective second plurality of menu items corresponding to each of the set first plurality of menu items.

12. The device of claim 8, wherein the user input unit is configured to receive a touch input on the first region for more than a first time, and
wherein the controller is configured to set, based on the received touch input, a mode of the device to an editing mode for editing the first plurality of menu items respectively displayed on the plurality of regions.

13. The device of claim 12, wherein the controller is configured to change a position of the first menu item in response to dragging and dropping of the first menu item displayed on the first region to another region on the lock screen.

14. The device of claim 13, wherein the controller is configured to change alignment positions of the first plurality of menu items, other than the first menu item, in response to changing the position of the first menu item.

15. A non-transitory computer-readable storage medium storing a computer program for executing the method of claim 1.

* * * * *